US012682633B2

(12) United States Patent (10) Patent No.: US 12,682,633 B2
Hammond (45) Date of Patent: Jul. 14, 2026

(54) IMAGE-DERIVED TEXT DELIVERY LOCATION DESCRIPTIONS

(71) Applicant: Wing Aviation LLC, Palo Alto, CA (US)

(72) Inventor: Marcus Hammond, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 251 days.

(21) Appl. No.: 18/600,051

(22) Filed: Mar. 8, 2024

(65) Prior Publication Data

US 2025/0285433 A1 Sep. 11, 2025

(51) Int. Cl.
| | |
|---|---|
| *G06V 20/17* | (2022.01) |
| *G06T 5/50* | (2006.01) |
| *G06V 10/44* | (2022.01) |
| *G06V 10/764* | (2022.01) |

(52) U.S. Cl.
CPC ............... *G06V 20/17* (2022.01); *G06T 5/50* (2013.01); *G06V 10/44* (2022.01); *G06V 10/764* (2022.01); *G06T 2207/20221* (2013.01)

(58) Field of Classification Search
CPC ...... G06V 20/17; G06V 10/44; G06V 10/764; G06T 5/50; G06T 2207/20221
See application file for complete search history.

(56) References Cited

U.S. PATENT DOCUMENTS

| | | | |
|---|---|---|---|
| 10,387,824 B2 | 8/2019 | Gillen et al. | |
| 10,402,774 B1 * | 9/2019 | Phillips .................. | G06N 20/00 |

| | | | |
|---|---|---|---|
| 10,414,495 B2 | 9/2019 | Natarajan et al. | |
| 10,450,091 B2 | 10/2019 | Mcmillian et al. | |
| 10,545,500 B2 | 1/2020 | Schubert et al. | |
| 10,691,944 B2 * | 6/2020 | Yang ........................ | G06N 3/08 |
| 10,783,478 B2 | 9/2020 | Studnicka | |
| 10,796,423 B2 | 10/2020 | Goja | |
| 10,893,107 B1 * | 1/2021 | Callari ................ | G06F 18/2115 |
| 11,472,552 B2 | 10/2022 | Gil et al. | |
| 11,769,108 B2 | 9/2023 | Sager et al. | |
| 11,853,889 B2 * | 12/2023 | Okazaki .................... | G06T 7/00 |
| 12,340,576 B2 * | 6/2025 | Desai .................. | G06F 18/2148 |

(Continued)

FOREIGN PATENT DOCUMENTS

| | | |
|---|---|---|
| CN | 113298151 A | 8/2021 |
| CN | 115810068 A | 3/2023 |
| CN | 114926835 B | 10/2025 |

OTHER PUBLICATIONS

International Searching Authority, International Search Report and Written Opinion, mailed Dec. 10, 2025, issued in connection with International Patent Application No. PCT/US2025/017514, filed Feb. 27, 2025, 9 pages.

(Continued)

*Primary Examiner* — Gregory M Desire
(74) *Attorney, Agent, or Firm* — McDonnell Boehnen Hulbert & Berghoff LLP

(57) ABSTRACT

A computer-implemented method includes obtaining an aerial image representing an object in an environment and providing the aerial image as input to a machine learning model. Based on the aerial image, and using the machine learning model, a textual description of a location of the object in the environment is generated and the textual description of the location of the object is outputted.

20 Claims, 19 Drawing Sheets

(56) References Cited

U.S. PATENT DOCUMENTS

| | | | |
|---|---|---|---|
| 2023/0312091 A1 | 10/2023 | Shoeb et al. | |
| 2023/0316739 A1 | 10/2023 | Shoeb et al. | |
| 2024/0020968 A1* | 1/2024 | Haskin | G06F 16/29 |
| 2024/0037487 A1* | 2/2024 | Clise | B64D 1/12 |

OTHER PUBLICATIONS

Cornia et al. M., "Meshed-Memory Transformer for Image Captioning," arXiv:1912.08226v2, http://arxiv.org/abs/1912.08226, Mar. 20, 2020, 15 pages.

Dosovitskiy et al., An Image is Worth 16x16 Words: Transformers for Image Recognition at Scale, arXiv:2010.11929v2, Published as a conference paper at ICLR 2021, Jun. 3, 2021, 22 pages.

Li et al., "mPLUG: Effective and Efficient Vision-Language Learning by Cross-modal Skip-connections," arXiv:2205.12005V2, May 25, 2022, 14 pages.

Shakhatreh et al., "Unmanned Aerial Vehicles (UAVs): A Survey on Civil Applications and Key Research Challenges," IEEE Access, 2019, pp. 48572-48634, vol. 7.

* cited by examiner

870

THE PACKAGE WAS DELIVERED AT 2:30PM PST IN THE BACK DROP ZONE OF THE PROPERTY OF THE RECIPIENT, 5M NORTH OF THE HOUSE STRUCTURE, 5M SOUTH OF THE NORTHERN PROPERTY LINE, AND 8M NORTHWEST OF TWO TREES.

970

THE PACKAGE WAS DELIVERED TO THE PROPERTY OF THE RECIPIENT AT 4:17PM CST, NEXT TO THE STAIRS TO THE FRONT DOOR AND 2M AWAY FROM THE PREDICTED DELIVERY LOCATION. THE PREDICTED DELIVERY LOCATION WAS BLOCKED BY A TREE.

1000

OBTAINING AN AERIAL IMAGE REPRESENTING AN OBJECT IN AN ENVIRONMENT

1002

PROVIDING THE AERIAL IMAGE AS INPUT TO A MACHINE LEARNING MODEL

1004

GENERATING, USING THE MACHINE LEARNING MODEL AND BASED ON THE AERIAL IMAGE, A TEXTUAL DESCRIPTION OF A LOCATION OF THE OBJECT IN THE ENVIRONMENT

1006

OUTPUTTING THE TEXTUAL DESCRIPTION OF THE LOCATION OF THE OBJECT

IMAGE-DERIVED TEXT DELIVERY LOCATION DESCRIPTIONS

BACKGROUND

With the increasing prevalence of package delivery, including package delivery by drones or uncrewed aerial vehicles (UAVs), it has become more common to send to recipients images of their deliveries to confirm and/or prove completion of the delivery. However, this practice raises significant challenges. For example, some recipients might not want image data to be stored and/or transmitted when, for instance, the image data represents portions of the recipient's property. Likewise, the recipients' neighbor may have similar concerns, for instance if the image data confirming delivery of the recipient's package represents a portion of the neighbor's property. Additionally, increasing size and/or number of the image data may involve additional data storage and transmission capabilities, thus adding to the operational costs of delivery services. Furthermore, in some cases, image data may be insufficient to adequately and/or accurately confirm completion of the delivery, depending on the quality of the original image data and/or data loss resulting from compression and/or transmission.

SUMMARY

Disclosed herein are various methods and systems for generating textual descriptions related to a location of an object in an environment, such as a payload delivered to a delivery location, based on image data representing the object in the environment. More specifically, an aerial image representing the object in the environment may be provided as input to a machine learning model. The machine learning model may be configured to generate a textual description of the location of the object within the environment. The machine learning model may include a generative machine learning model configured to process the aerial image and, based thereon, output the textual description. For example, an aerial vehicle that has delivered a package to a recipient's backyard could capture an aerial image representing a location of the package in the backyard, and the machine learning model may be used to generate, based on the aerial image, a textual description of the location of the package in the backyard. The textual description may be sent to the recipient to inform the recipient of the location of the package, and may serve as proof and/or confirmation that delivery of the package has been completed.

In a first example embodiment, a computer-implemented method may include obtaining an aerial image representing an object in an environment, and providing the aerial image as input to a machine learning model. Using the machine learning model, and based on the aerial image, a textual description of a location of the object in the environment may be generated, and the textual description of the location of the object may be provided as output.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
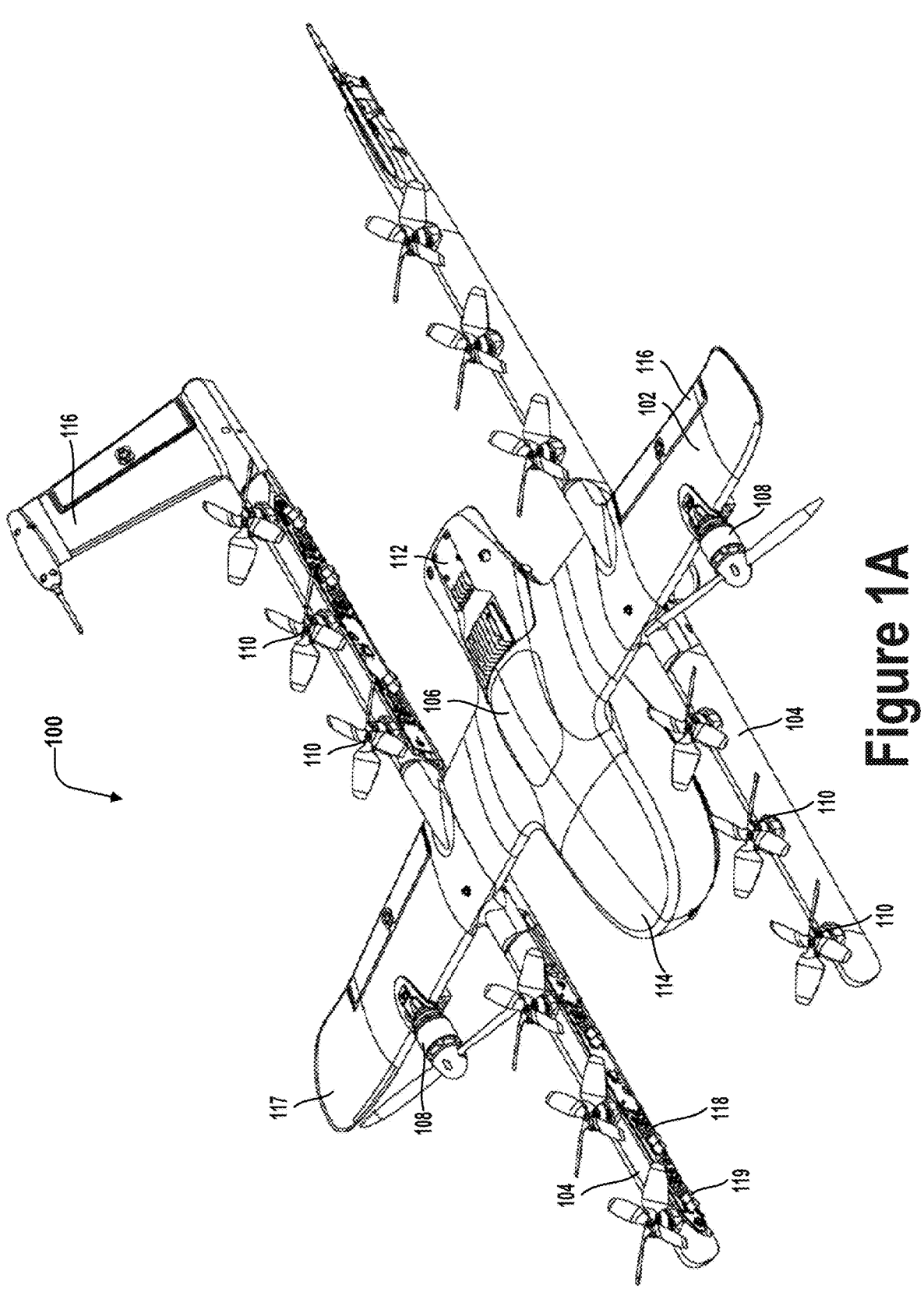
FIG. 1A illustrates an uncrewed aerial vehicle, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Disclosed herein are various examples of methods and systems to generate textual descriptions of locations of objects in an environment represented by an aerial image. These methods and systems can be used to, for example, generate text describing a location to which a package was delivered (e.g., on a recipient's property) based on a drone-captured aerial image. The textual description may be used as part of a proof and/or confirmation that delivery of the package was successful. For example, the textual description may serve as an additional or alternative proof-of-delivery to sending an image of the delivered package.

The generation of a textual description based on aerial images can be performed using a machine learning model. The machine learning model may be trained using training samples that include, for example, pairs of (i) aerial images containing training objects located in training environments and (ii) corresponding textual descriptions of respective locations of the training objects. The machine learning model can be trained to generate textual descriptions that, for example, anonymize visual information and/or exclude references to environmental objects outside a designated boundary in the training environment. This could be used to, for example, generate textual descriptions that reference objects in the recipient's property but do not reference a neighboring property and/or objects therein.

In some cases, the methods and systems disclosed herein can process the aerial images before providing the aerial images as input to the machine learning model. Examples of such processing include creating a composite aerial image from multiple aerial images, and/or using a semantic model to identify and/or classify visual features in the aerial images. In some implementations, the machine learning model may be configured to generate the textual descriptions further based on satellite-based navigation data associated with the aerial image, information about a time at which the aerial image was capture, an altitude at which the aerial image was captured, and/or other data indicative of a location of the object.

Using such textual descriptions may improve the privacy and security of, for example, payload delivery processes. For example, the textual description of a drop-off location of a delivered payload may include information that is sufficient for locating the payload, but may exclude other, potentially private, information related to the drop-off location. It may be difficult, impractical, and/or impossible to exclude this other information from an aerial image of the drop-off location. Thus, the textual description may provide a filtered, anonymized, and/or depersonalized representation of at least some of the information in the aerial image. Additionally, the textual descriptions may require less memory than images, and may thus allow for more efficient storage and transmission. Further, the textual descriptions may also be more robust than images since textual information might not suffer from the same potential degradations as image data.

II. Example Uncrewed Vehicles

Herein, the terms "unmanned aerial system," "uncrewed aerial system," and/or "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), "unmanned aerial vehicle," and/or "uncrewed aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and/or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
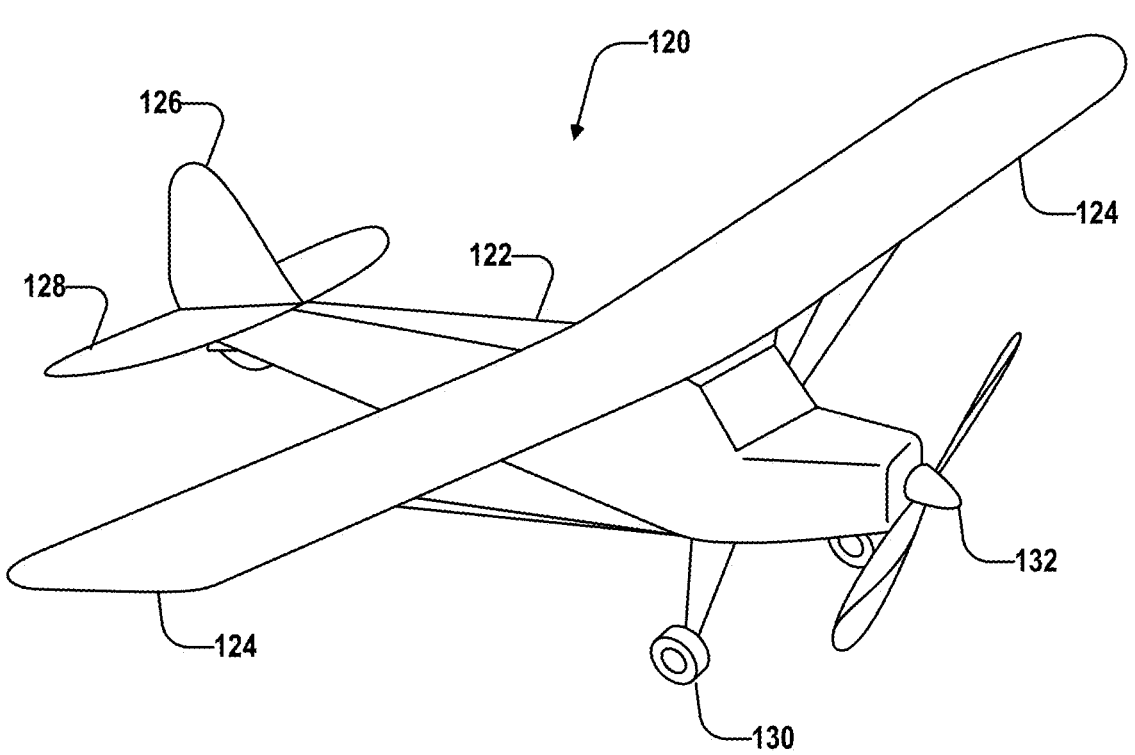
FIG. 1B illustrates an uncrewed aerial vehicle, in accordance with examples described herein.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
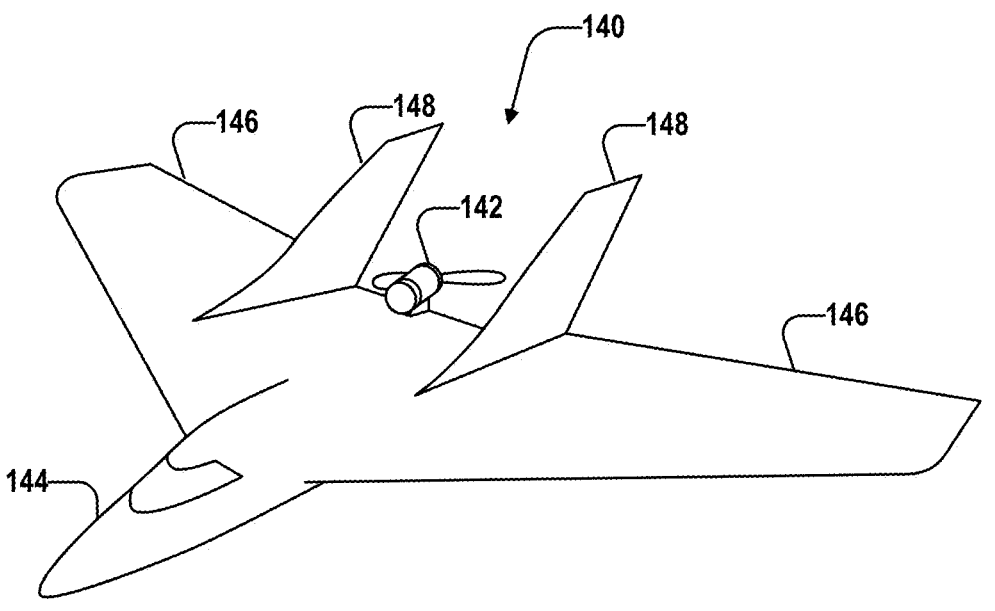
FIG. 1C illustrates an uncrewed aerial vehicle, in accordance with examples described herein.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
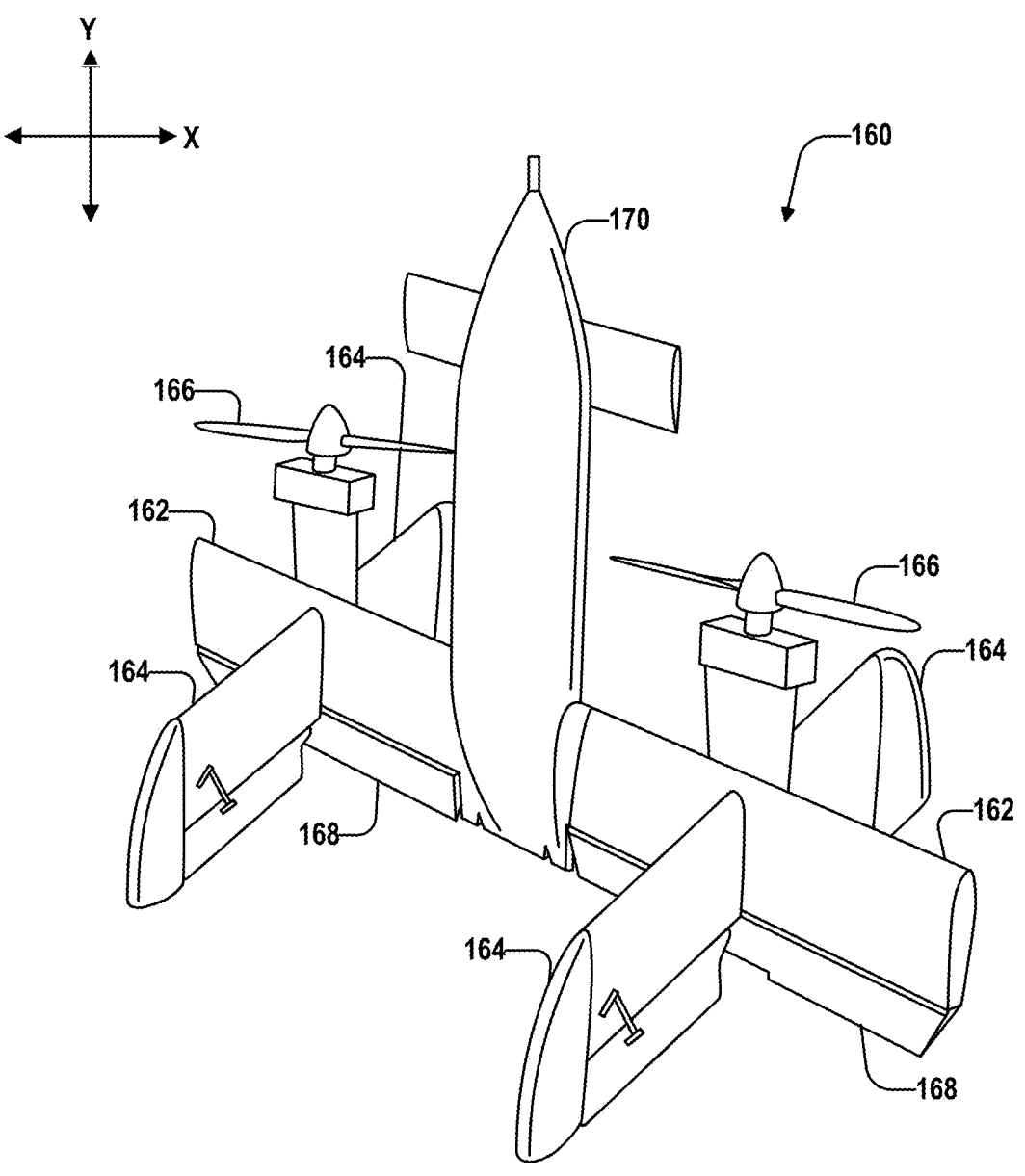
FIG. 1D illustrates an uncrewed aerial vehicle, in accordance with examples described herein.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
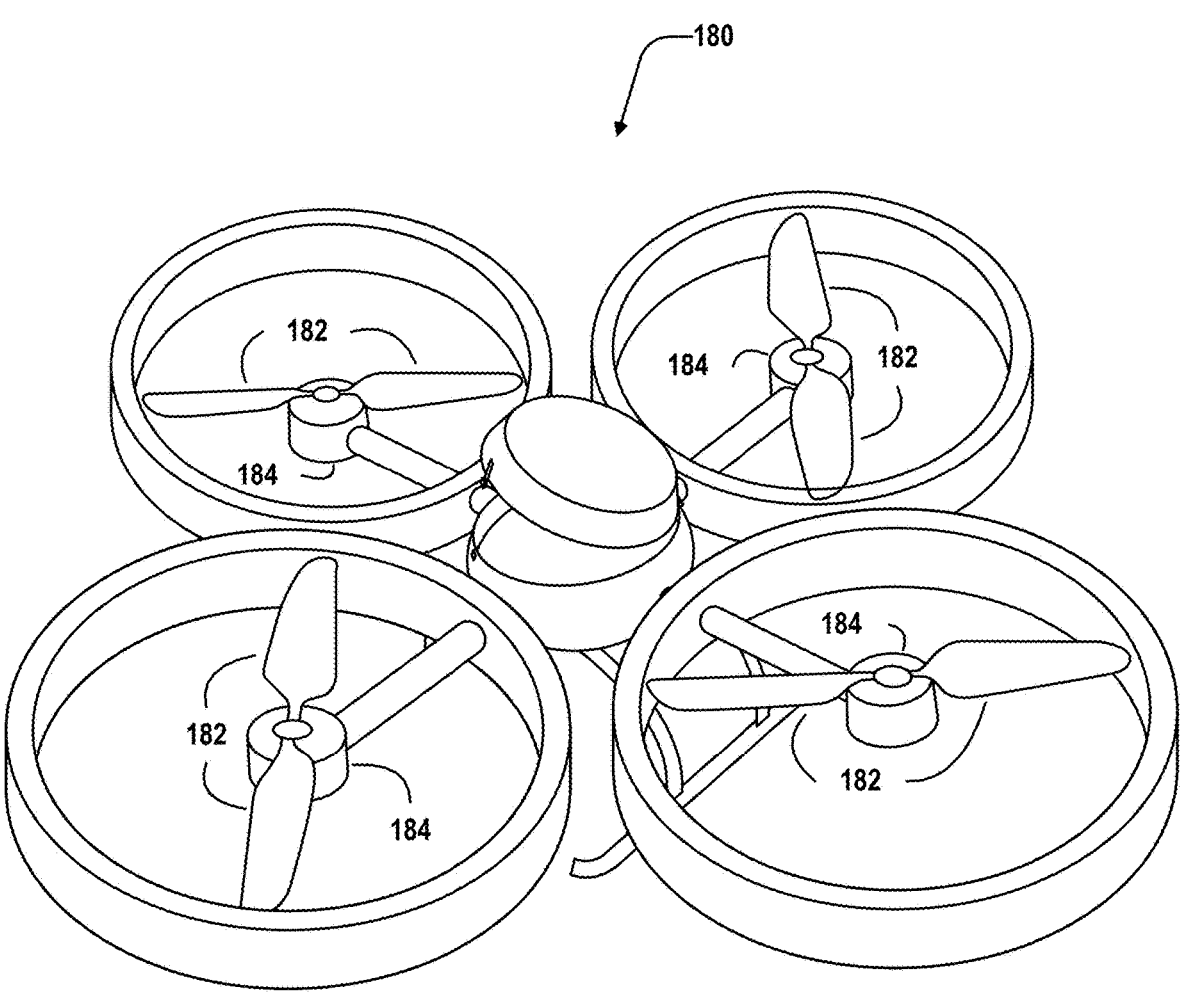
FIG. 1E illustrates an uncrewed aerial vehicle, in accordance with examples described herein.

As noted above, some embodiments may involve other types of UAVs, in addition to or in the alternative to fixed-wing UAVs. For instance, FIG. 1E shows an example of rotorcraft 180 that is commonly referred to as a multicopter. Multicopter 180 may also be referred to as a quadcopter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "unmanned" or "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or predetermined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Example UAV Components

Figure 2:
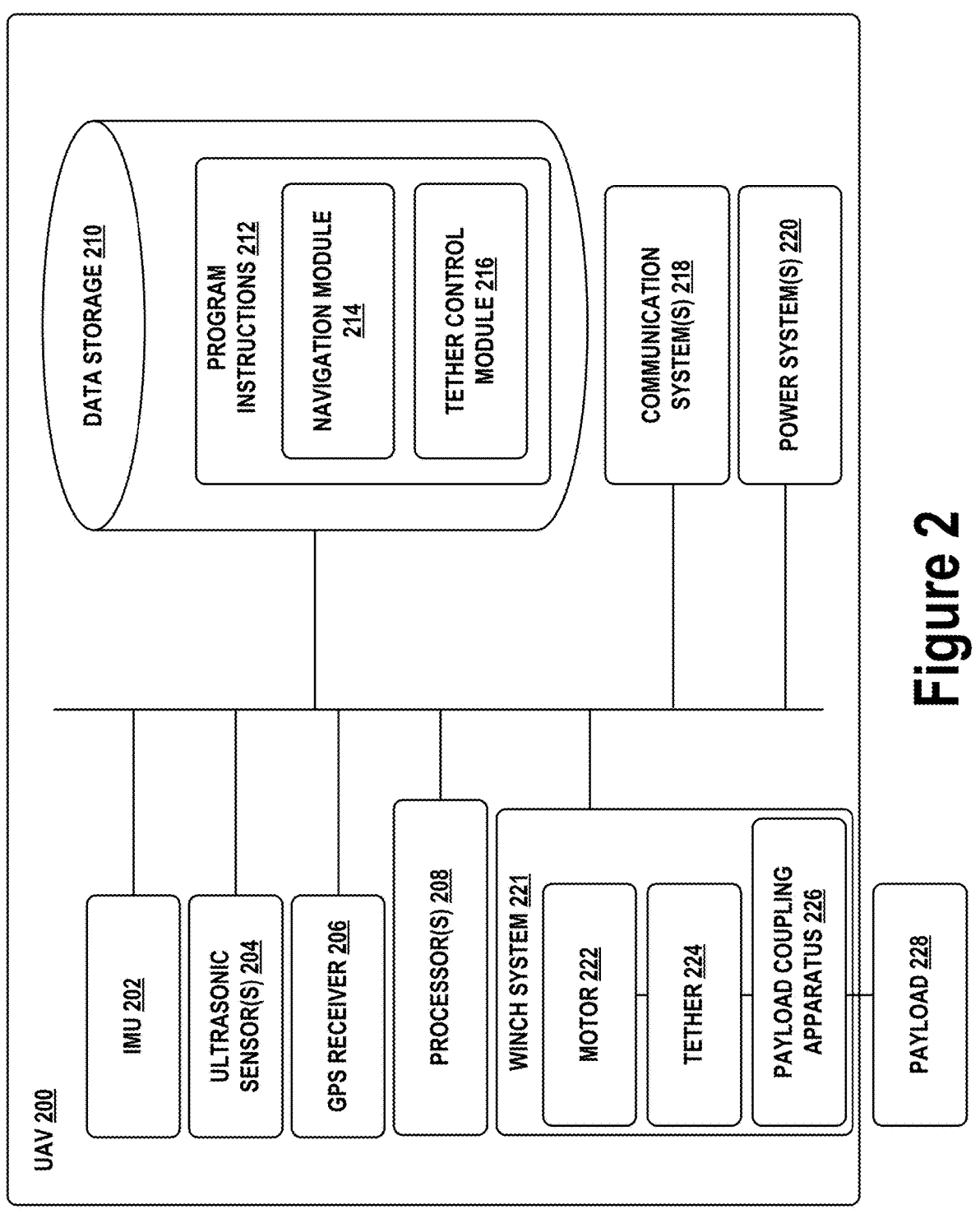
FIG. 2 illustrates components of an unmanned aerial system, in accordance with examples described herein.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein.

For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals-in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

IV. Example UAV Deployment Systems

Figure 3:
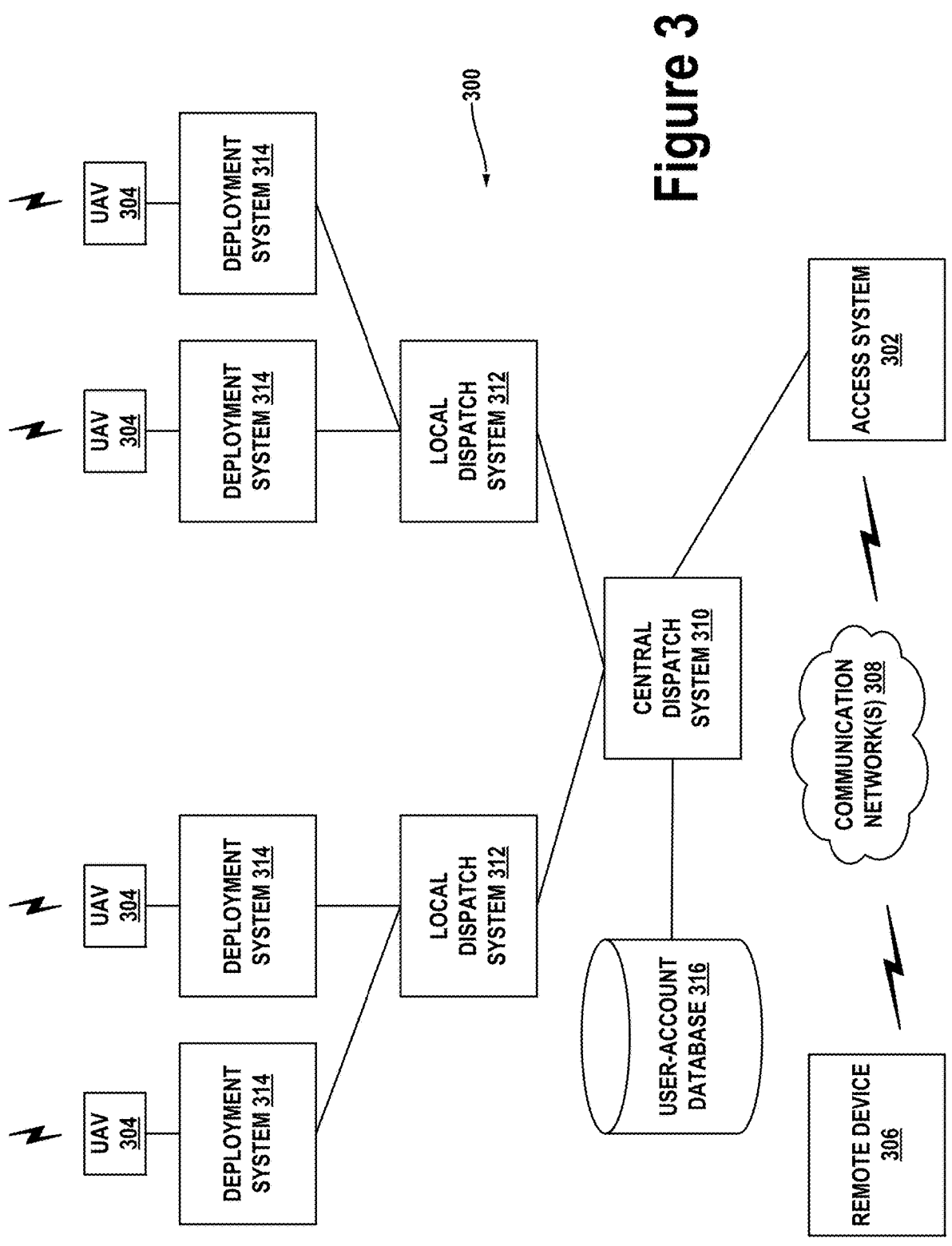
FIG. 3 is a block diagram illustrating a distributed UAV system, in accordance with examples described herein.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UA Vs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Deployment system 314 could also include other structures and/or systems to assist and/or facilitate UAV landing processes.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

V. Example Systems and Methods for Generating Textual Descriptions

Figure 4:
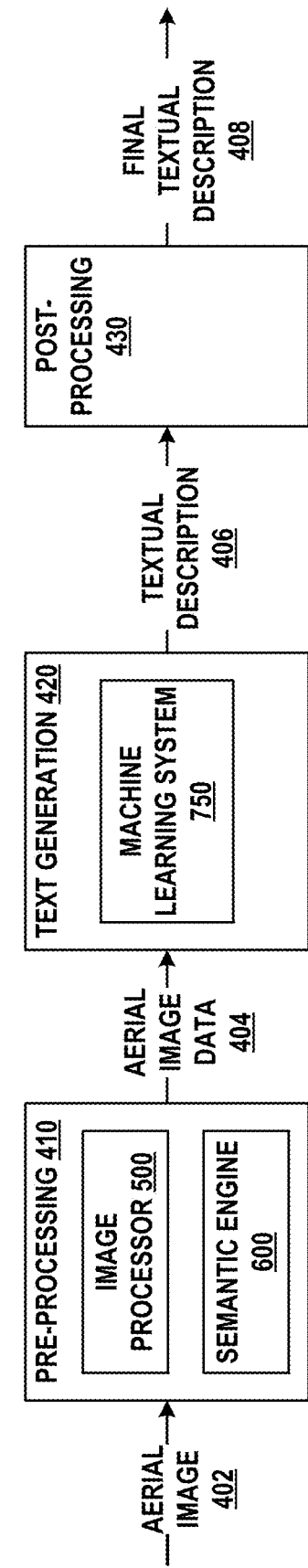
FIG. 4 is a block diagram illustrating generation of a textual description, in accordance with examples described herein.

FIG. 4 illustrates an example system 400 for generating textual descriptions based on image data. System 400 can be implemented on and/or using any of the devices described above (e.g., the UAV), and/or on other computing devices that may communicate with some or all of the devices described above. System 400 may include pre-processing block 410, text generation block 420, and post-processing block 430. System 400 may be implemented using hardware, software, or a combination thereof.

Aerial image 402 can be captured by, for example, a camera on the UAV (e.g., a ground-facing camera), among other possibilities. Aerial image 402 could include a raw aerial image and/or an aerial image that has been processed (e.g., compressed or filtered). Aerial image 402 may represent a plurality of aerial images. For example, the UAV may be configured to capture aerial image 402 before and/or after delivering an object to the environment. For instance, the object may be a package delivered by the UAV, and the UAV may capture aerial image 402 representing the delivered package and the surrounding environment as proof-of-delivery.

Pre-processing block 410 may be configured to perform one or more image processing operations on aerial image 402. For example, aerial image 402 may be resized, cropped, adjusted for brightness/contrast, and/or filtered. Aerial image 402 may be reformatted to fit a predetermined size and/or color profile based on pre-configured or dynamic settings. As an example, an aerial image of a delivered package could be adjusted such that the package is centered in the frame of the aerial image. The operations of pre-processing block 410 may additionally include operations performed by an image processor 500 and/or a semantic engine 600, which are discussed in more detail in connection with FIGS. 5 and 6, respectively. Pre-processing block 410 may be configured to output aerial image data 404, which could include the results of the processing operations (e.g., a composite aerial image or a semantic map based on aerial image 402) and/or additional information associated with aerial image 402 (e.g., an altitude at which aerial image 402 was captured).

Text generation block 420 may be configured to generate textual description 406 based on aerial image data 404. Text generation block 420 can include machine learning system 750, as described in more detail in connection with FIGS. 7A and 7B. Text generation block 420 can output textual description 406 through use of machine learning system 700. Aerial image data 404 may include a processed version of aerial image 402 and/or other information associated with aerial image 402. Textual description 406 can describe a location of an object in an environment as represented by aerial image data 404. Additionally, text generation block 420 may be configured to generate textual description 406 to anonymize visual information contained in aerial image data 404.

Post-processing block 430 may be configured to perform various post-processing operations on textual description 406. For example, textual description 406 may be shortened and/or filtered according to pre-configured or dynamic settings. Additionally or alternatively, textual description 406 may be post-processed for spell checking, grammar correction, sentence and paragraph restructuring for improved flow, punctuation and capitalization adjustments, consistency and clarity checks, and/or appropriate formatting (e.g., bullet points, headings). Post-processing block 430 may be configured to output final textual description 408 resulting from post-processing operations, if any occur. As such, final textual description could be the same as or different from textual description 406.

Final textual description 408 may be provided as an output of system 400. Final textual description 408 can describe an object's location within an environment based on aerial image 402 and/or aerial image data 404. In some embodiments, final textual description 408 may describe the object's location in relation to other objects in the environment. For instance, final textual description 408 might state that the object is "in close proximity to a pine tree" or "between two structures." In additional or alternative embodiments, final textual description 408 may describe the object's location using cardinal directions, such as "north" or "south." Final textual description 408 may also incorporate visual features from aerial image data 404, such as "the object is in front of a red car," if, for instance, aerial image data 404 represents a red car in the environment. In some cases, final textual description 408 may include temporal data, such as the time as which aerial image 402 was captured.

In some embodiments, outputting final textual description 408 may include transmitting final textual description 408 (e.g., to a client device), storing final textual description 408, and/or causing final textual description 408 to be displayed (e.g., using the client device). This could be used in practice to, for example, generate a textual description of a package delivered via drone to a recipient's property based on aerial images of the delivered package taken by the drone, and then send the textual description to the recipient. For instance, the recipient could receive a text message alerting them of the package delivery and providing the textual description to describe and/or detail the delivery location of the package on the recipient's property.

The system and methods disclosed herein may be configured to receive, from the client device, a response to the transmitted textual description and update, based on the response, a status associated with the object. For instance, returning to the example above, if a textual description of the package delivery location is sent via text message to the recipient, the recipient could send a message in response confirming receipt of the package. This response may be received, and a delivery state of the package may be updated based on the response, e.g., from "package delivered, receipt unconfirmed" to "package delivered, receipt confirmed."

In further embodiments, final textual description 408 may be modified and re-transmitted to the client device based on the response. For example, final textual description 408 could be initially generated by machine learning system 750 based on aerial image data 404, and transmitted to a client device. A user of the client device could see final textual description 408 and respond with a question, such as "what time was the package delivered?". Then, machine learning system 750 could generate a modified final textual description 408 with an estimated delivery time included, based on the response from the client device and aerial image data 404, and resend the modified final textual description 408 back to the client device.

VI. Image Processor

Figure 5:
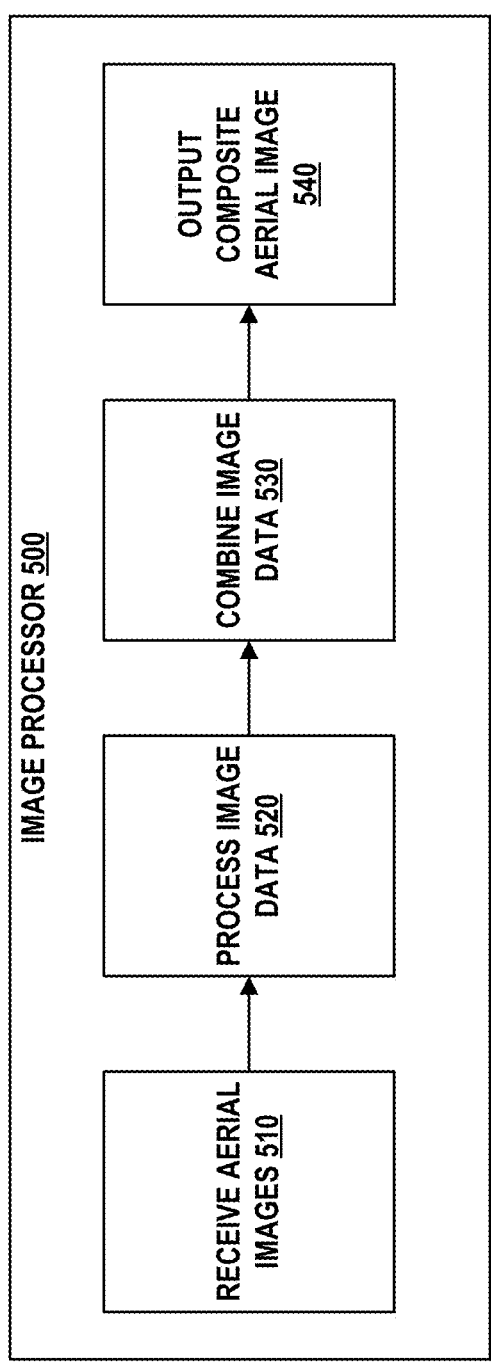
FIG. 5 is a block diagram illustrating image processing operations, in accordance with examples described herein.

FIG. 5 illustrates examples of operations performed by image processor 500, which may be performed as part of the operations of pre-processing block 410 in FIG. 4.

At receive aerial images block 510, image processor 500 may be configured to receive one or more aerial images, e.g., aerial image 402. The aerial images could all be received simultaneously, or there may be a temporal delay in receiving the aerial images. The received aerial images may all represent the same environment from, for example, different altitudes and/or from different points of view.

At process image data block 520, image processor 500 may be configured to process one or more aerial images to, for example, facilitate combining them. For instance, image processor 500 could obtain various altitudes at which each aerial image was captured to sort the aerial images from highest to lowest altitude. As another example, image processor 500 could extract various times at which each aerial image was captured to sort the aerial images chronologically. As yet another example, image processor 500 could obtain satellite-based navigation data to arrange the aerial images according to their relative locations of capture. The operations of process image data block 520 could additionally include cropping or zooming in to one or more aerial images to, for example, magnify the location of a delivered package in each aerial image.

At combine image data block 530, image processor 500 may be configured to determine a composite aerial image by combining image data from a plurality of received aerial images. For instance, if three aerial images of a delivered package are received, each from a different point of view, image processor 500 may stitch these images together, resulting in one composite aerial image of the delivered package that includes more aerial image data than any one of the individual aerial images alone. This may result in a composite aerial image containing more visual information, more metadata (e.g., representing a total time over which a package was delivered), a greater resolution, and/or a better aspect ratio, among other possibilities.

At output composite aerial image 540, image processor 500 may be configured to output the composite aerial image. The composite aerial image may be further pre-processed, e.g., with additional operations described at pre-processing block 410 in FIG. 4.

VII. Semantic Engine

Figure 6:
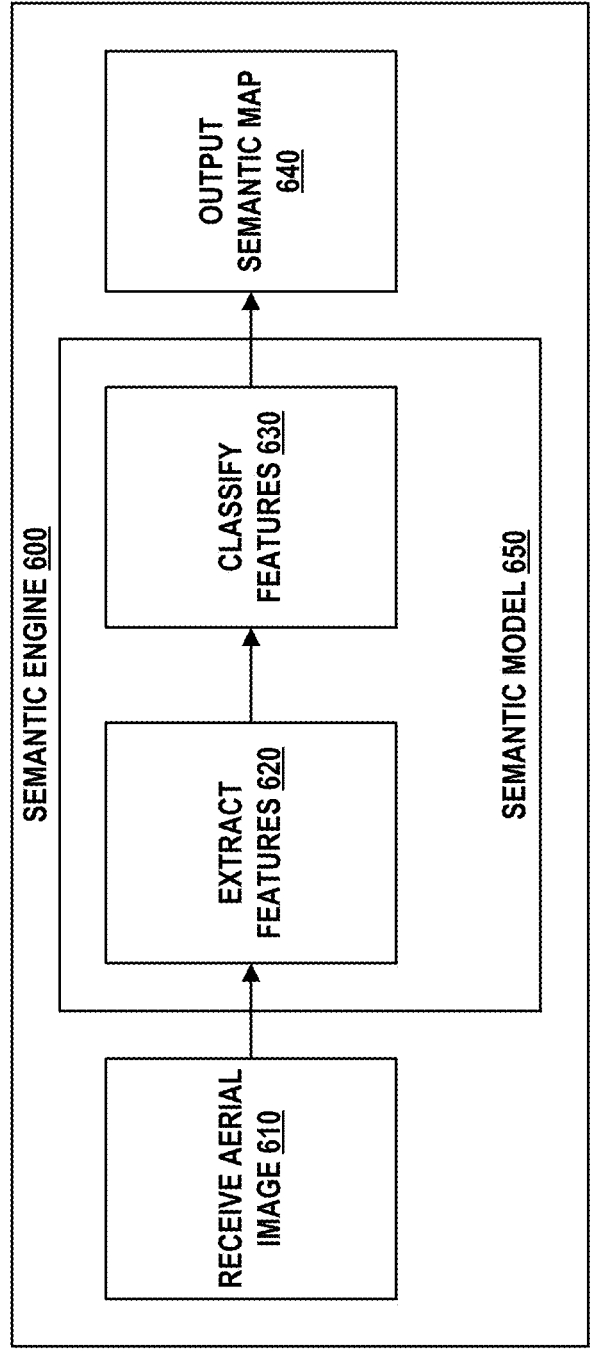
FIG. 6 is a block diagram illustrating semantic processing operations, in accordance with examples described herein.

FIG. 6 illustrates examples of operations performed by semantic engine 600, which may be performed as part of the operations of pre-processing block 410 in FIG. 4.

At receive aerial image block 610, semantic engine 600 may be configured to receive an aerial image, e.g., aerial image 402 from FIG. 4. The received aerial image could be a composite aerial image or another aerial image that has already been pre-processed or modified in some way. Some examples of the received aerial image may depict an environment with a delivered package and other surrounding objects, such as roads, structures, and/or foliage, among other possibilities.

Semantic model 650 may be a machine learning model and/or an image processing algorithm, though other possibilities exist. Semantic model 650 may be configured to perform, for example, semantic segmentation, object detection, and/or object recognition. Semantic segmentation may involve segmenting an image into different parts, and assigning each pixel to a class. For example, in an image of a street scene, semantic segmentation may involve classifying pixels into categories like "car," "pedestrian," and "road." Object detection may include identifying and localizing objects within an image by outputting bounding boxes around detected objects and classifying the type of object within each box. For instance, in an image of a package delivered to a construction site, object detection may include detecting and labelling "crane," "building," "package," etc. Object recognition may involve identifying objects in an image and providing a list of recognized objects and their positions. For example, in an aerial image of a package delivered to a school, object recognition may include recognizing and outputting "classroom," "children," "package," etc. Semantic model 650 may include extract features block 620 and/or classify features block 630, which may be executed sequentially or simultaneously, among other possibilities.

At extract features block 620, semantic model 650 may be configured to extract features from the received aerial image. In some examples, the features can be visual features. These operations could include, for example, generating a feature mask that represents feature outlines and/or regions associated with and/or occupied by particular features depicted in the aerial image. For instance, a convolution feature map could be generated (i.e., a set of filtered images created by applying convolutional operations to the input image using a convolutional neural network, where each feature map specifics corresponding features or patterns). As another example, the feature mask could be a semantic mask (i.e., an image that segments the input image based on semantic information, assigning each segment a specific class). For instance, in an image with a car, pedestrian, and road, a semantic mask may segment the image into three regions corresponding to each object.

Additionally or alternatively, the extracted features may be associated with metadata or other information about the aerial image, such as a time at which the aerial image was captured and/or a location where the aerial image was captured. In some examples, the features may be extracted based at least in part on feature information communicated from other sources (e.g., a ground control station). In some examples, the features may be derived from other sensors of the UAV or sensors of different UAVs.

At classify features block 630, semantic model 650 may be configured to classify the extracted features of the aerial image. In some examples, the operations of classify features block 630 could include generating a list of identified features, for example "package" and "tree" if the aerial image includes as package and a tree. In some examples, the visual features of the aerial image could be associated with a label identifying the corresponding feature. In some examples, non-visual features could be classified based on the type of data they represent, for instance a timestamp could be extracted and classified as a time.

At output semantic map block 640, semantic engine 600 may be configured to output a semantic map. In some examples, the semantic map may be a semantic segmentation image. The semantic map may include semantic labels, which may also be referred to herein as semantic classifications. In some examples, a semantic map includes, for each respective visual feature of a plurality of visual features in the aerial image, a corresponding classification of the respective visual feature. In the case of a package delivery, classifications could include information about objects in a delivery environment, such as "house," "tree," "bush," "car," "road," "package," "person," and/or information about whether the objects belong to the recipient or a neighbor, and/or information about whether or not a region is suitable for delivery or not, among other possibilities.

In some examples, the dimensions of the semantic map (e.g., width and height in pixels) may match (e.g., be equal to or proportional to) the dimensions of the aerial image. In some examples, the aerial image may include a plurality of aerial images, and the semantic map may be determined based on semantic information from the plurality of aerial images. For instance, the semantic map can be based on individual semantic maps for each image in the plurality of aerial images. In some examples, the classifications may include buildings, roads, vegetation, vehicles, driveways, lawns, and sidewalks, among other possibilities.

The operations of extract features block 620 and classify features block 630 may form part of semantic model 650, which can be a machine learning model trained to extract and classify features. Machine learning systems and models are discussed in more detail in the section below.

VIII. Machine Learning

Figure 7A:
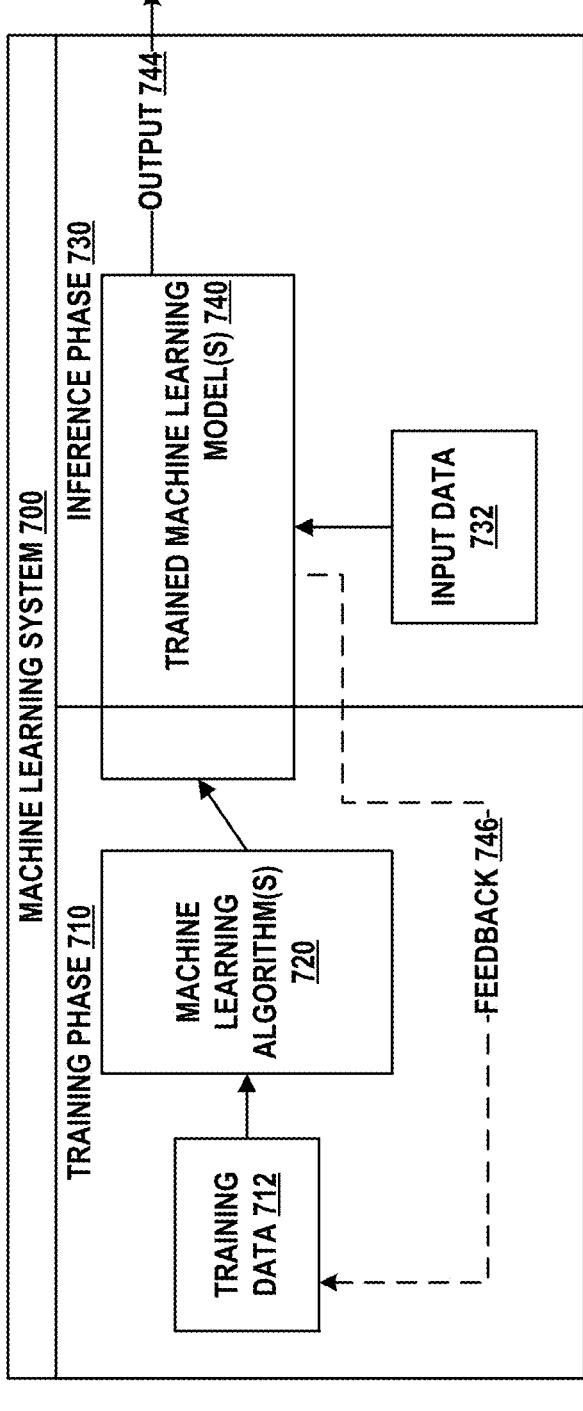
FIG. 7A illustrates training and inference phases of a machine learning model, in accordance with examples described herein.
Figure 7B:
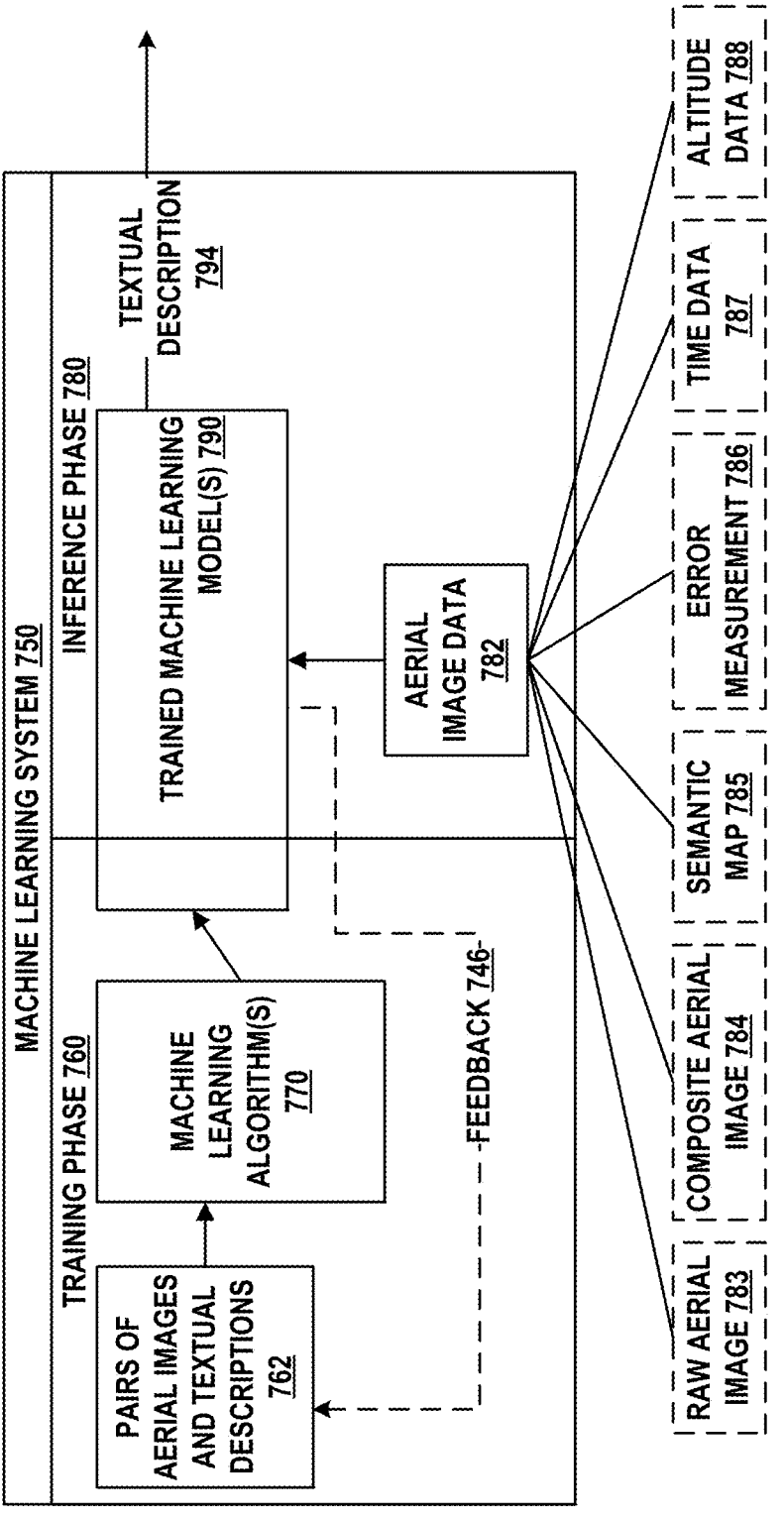
FIG. 7B illustrates training and inference phases of a machine learning model, in accordance with examples described herein.

FIG. 7A illustrates training and inference phases of machine learning system 700, which generally represents operations associated with generating output data based on input data. FIG. 7B illustrates training and inference phases of machine learning system 750, which represents operations associated with generating textual delivery location descriptions based on aerial images, among other types of input data. Thus, machine learning system 750 represents an example application of machine learning system 700 for generating image-derived text to represent object location(s) in an environment.

FIG. 7A shows machine learning system 700 illustrating training phase 710 and inference phase 730 of trained machine learning model(s) 740. Some machine learning techniques involve training one or more machine learning algorithms on an input set of training data to recognize patterns in the training data and provide output inferences and/or predictions about (patterns in the) training data. The resulting trained machine learning algorithm can be referred to as a trained machine learning model. For example, FIG. 7A shows training phase 710 where one or more machine learning algorithm(s) 720 use training data 712 to train, generate, and/or determine trained machine learning model(s) 740. Then, during inference phase 730, trained machine learning model(s) 740 can receive input data 732 and responsively provide as an output one or more outputs 744.

As such, trained machine learning model(s) 740 can include a trained version of one or more machine learning algorithm(s) 720. Machine learning algorithm(s) 720 may include, but are not limited to: an artificial neural network (e.g., a convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 720 may be supervised or unsupervised, and may implement any suitable combination of online and offline learning.

In some examples, machine learning algorithm(s) 720 and/or trained machine learning model(s) 740 can be accelerated using on-device processors, such as graphic processing units (GPUs), tensor processing units (TPUs), digital signal processors (DSPs), and/or application specific integrated circuits (ASICs). Such on-device processors can be used to speed up machine learning algorithm(s) 720 and/or trained machine learning model(s) 740. In some examples, trained machine learning model(s) 740 can be trained, reside, and/or execute to provide inferences on a particular UAV or other computing device, and/or otherwise can make inferences for the particular UAV or other computing device.

During training phase 710, machine learning algorithm(s) 720 can be trained by providing at least training data 712 as training input using supervised, unsupervised, semi-supervised, and/or reinforcement learning techniques.

Supervised learning involves providing a portion of training data 712 to machine learning algorithm(s) 720, with machine learning algorithm(s) 720 determining one or more output inferences based on the provided portion of training data 712, and the output inference(s) are either accepted or corrected based on correct results associated with training data 712. In some examples, supervised learning of machine learning algorithm(s) 720 can be governed by a set of rules and/or a set of labels for the training input, and the set of rules and/or set of labels may be used to correct inferences of machine learning algorithm(s) 720. Supervised learning of machine learning algorithm(s) 720 may include training data 712 provided by human operators and/or a trusted dataset, which may in some examples be provided by a third party.

Unsupervised learning involves providing a portion (or all) of training data 712 to machine learning algorithm(s) 720 and machine learning algorithm(s) 720 determining one or more output inferences based on the provided portion (or all) of training data 712. Unsupervised learning does not depend on training data 712 being labeled, as opposed to supervised learning, which does. Instead of being guided by labeled data, unsupervised learning algorithms are designed to identify patterns and structures in input data on their own. Unsupervised learning of machine learning algorithm(s) 720 may include clustering, anomaly detection, or dimensionality reduction.

Semi-supervised learning involves having correct results for part, but not all, of training data 712. During semi-supervised learning, supervised learning is used for a portion of training data 712 having correct results, and unsupervised learning is used for a portion of training data 712 not having correct results.

Reinforcement learning involves machine learning algorithm(s) 720 receiving a reward signal regarding a prior inference, where the reward signal can be a numerical value. During reinforcement learning, machine learning algorithm(s) 720 can output an inference and receive a reward signal in response, where machine learning algorithm(s) 720 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 720 and/or trained machine learning model(s) 740 can be trained using other machine learning techniques, including but not limited to, incremental learning and curriculum learning.

In some examples, machine learning algorithm(s) 720 and/or trained machine learning model(s) 740 can use transfer learning techniques. For example, transfer learning techniques can involve trained machine learning model(s) 740 being pre-trained on one set of data and additionally trained using training data 712.

Once machine learning algorithm(s) 720 and/or the pre-trained machine learning model has been trained on at least training data 712, training phase 710 can be completed. The trained resulting machine learning model can be utilized as at least one of trained machine learning model(s) 740.

During inference phase 730, trained machine learning model(s) 740 can receive input data 732 and generate and output one or more corresponding output 744 based on input data 732. For example, trained machine learning model(s) 740 can generate output 744.

Output 744 can include output images, intermediate images, numerical values, and/or other output data produced by trained machine learning model(s) 740 operating on input data 732 during inference phase 730 (or training data 712 during training phase 710). In some examples, trained machine learning model(s) 740 can use output 744 as input feedback 746. Trained machine learning model(s) 740 can also rely on past inferences as inputs for generating new inferences.

In the context of this disclosure, semantic model 650 of FIG. 6 may include a machine learning model, such as machine learning system 700. In some examples, training data 712 may include a collection of aerial images provided by one or more sources, and during training phase 710, machine learning algorithm(s) 720 can be used to create trained machine learning model(s) 740 to extract and/or classify features from aerial images to facilitate outputting a semantic map. Input data 732 can be one or more aerial images, such as a still aerial image, aerial video frames, aerial images resident on a UAV, and/or other aerial images. In some examples, trained machine learning model(s) 740 could be prompted to generate output 744. Output 744 could be a set of features, a classification of features, and/or a semantic map, as discussed above in the context of semantic engine 600 of FIG. 6.

FIG. 7B illustrates training and inference phases of example machine learning system 750. The operations of FIG. 7B are similar to those of FIG. 7A, but are adapted to an example use for generating textual descriptions of locations of objects based on aerial image(s). As such, similar systems and methods to those of FIG. 7A may be employed in the context of FIG. 7B.

Accordingly, in some examples, during training phase 760, pairs of aerial images and textual descriptions 762 may be provided as training data for machine learning algorithm(s) 770. For example, pairs of aerial images and textual descriptions 762 may include a plurality of training samples. Each respective training sample of the plurality of training samples may include (i) a corresponding aerial image of a corresponding training environment and (ii) a corresponding textual description of a location of a training object located in the corresponding training environment. Examples of training environments and textual descriptions of locations of training objects could include aerial images of a residential neighborhood and textual descriptions indicating the location of objects such as "car parked in driveway," "children playing in the park," "mailboxes along the street," or aerial images of a construction site with textual descriptions such as "cranes near the unfinished building," "construction materials piled in the center," "workers assembling scaffolding." Such training samples might be taken from publically-available datasets, such as geotagged social media posts. For instance, a picture of a coffee shop posted on social media could include a textual description like "coffee shop on the corner of Main St. and Elm St." Another source of training samples could include publically available satellite imagery. For example, aerial imagery provided by Google Maps that is labeled or publically available city maps used in conjunction with aerial images captured by drones, among other possibilities.

The training samples may be used to pre-train machine learning algorithm(s) 770, and then trained machine learning model(s) 790 could be further fine-tuned on delivery-specific training samples. For example, delivery-specific training samples may include previously captured aerial images of packages delivered to an environment with corresponding textual descriptions of the package locations. Training samples could also be obtained from recipients of delivery packages, e.g., by sending recipients aerial images of their delivered packages and prompting them to respond with a caption describing the location of the delivered package.

Some examples of model architectures on which trained machine learning model(s) 790 could be based include convolutional neural networks (CNNs), such as VGGNet or ResNet, recurrent neural networks (RNNs), such as long short-term memory (LSTM), gated recurrent units (GRUs), generative adversarial networks (GANs), transformer models, such as BERT, or auto encoders, among other possibilities. For instance, machine learning model(s) 790 may include and/or be based on the architecture described in a paper titled "An Image is Worth 16×16 Words: Transformers for Image Recognition at Scale," authored by Dosovitskiy et al. and published as arXiv:2010.11929, which is incorporated herein by reference. As another example, machine learning model(s) 790 may include and/or be based on the architecture described in a paper titled "Meshed-Memory Transformer for Image Captioning," authored by Cornia et al. and published as arXiv:1912.08226, which is incorporated herein by reference. As yet another example, machine learning model(s) 790 may include and/or be based on the architecture described in a paper titled "mPLUG: Effective and Efficient Vision-Language Learning by Cross-modal Skip-connections," authored by Li et al. and published as arXiv:2205.12005, which is incorporated herein by reference.

Trained machine learning model(s) 790 may be configured to perform various image-to-text tasks, such as image captioning, visual question answering, and/or visual relationship detection, among other possibilities. Image captioning may include generating textual descriptions of images by describing the content of the image in detail using text. For example, in connection with an image of a package next to a front door, image captioning may include generating a caption such as "a cardboard box next to a door." Visual question answering may involve answering questions about an image, such as "what color is the package?" Visual relationship detection may include detecting relationships between objects in an image. For example, in connection with an image of a person holding a package, visual relationship detection may include identifying the relationship as "holding."

Trained machine learning model(s) 790 may be configured to generate textual descriptions that anonymize visual information contained in the aerial images from the plurality of training samples. For example, visual information may be anonymized by generating, for each respective training sample, the corresponding textual description such that the corresponding textual description does not make reference to predetermined object(s), and/or to object(s) outside of a designated boundary within the training environment, among other possibilities. The anonymization of visual information could include only referencing objects present in or on a package recipient's property and not referencing objects present in or on a neighboring property. As another example, the anonymization of visual information may omit personally-identifying information. For instance, if an aerial image captures a package delivered next to the recipient's car, with a license plate number visible, trained machine learning model(s) may be configured to omit information about the license plate number.

Visual information may be anonymized by generating and/or using an intermediate aerial image in which portions of the environment are blurred and/or masked, thus preventing and/or inhibiting text generation block 420 from referencing these portions of the environment in textual description 406 and/or 408. For instance, the intermediate aerial image could include a semantic map (e.g., similar to semantic map 785), which may include colored and/or classified regions representing different parts of the aerial image(s) to which the semantic map corresponds. Thus, the intermediate representation may anonymize some or all visual information by displaying the colored and/or classified regions (e.g., a "color-by-numbers" representation of the aerial image(s)) and omitting the underlying pixel data of the aerial image(s). In some examples, such an intermediate aerial image could be provided to a recipient in addition to or as an alternative to a textual description that anonymizes visual information contained in the aerial images.

During inference phase 780, trained machine learning model(s) 790 may be configured to process aerial image data 782. Aerial image data 782 may include raw aerial image 783 representing an object in an environment, and/or could include processed aerial image data, such as composite aerial image 784, semantic map 785, or other processed aerial image data. Trained machine learning model(s) 790 may be configured to generate, based on aerial image data 782, textual description 794 of a location of an object in the environment.

In some examples, aerial image data 782 can include one or more aerial images provided by one or more sources. The one or more aerial images can include still aerial images, aerial video frames, aerial images resident on a UAV, and/or other aerial images. In some examples, aerial image data 782 may include one or more two-dimensional (2D) aerial images captured by a ground-facing camera on a UAV and representing an environment of the UAV. The aerial images of the environment may represent, among other possibilities, a terrain beneath the UAV when the UAV is navigating from a starting location to a target location. The aerial images of the environment may also include a delivery zone to which the UAV is tasked with delivering a package.

In some examples, aerial image data 782 can include a composite aerial image 784, such as the one discussed in the context of FIG. 5. Aerial image data 782 can include a semantic map 785, where semantic map 785 has been generated using a semantic model and based on, for instance, raw aerial image 783. Semantic map 785 represents, for each respective visual feature of a plurality of visual features in raw aerial image 783, a corresponding classification of the respective visual feature. Accordingly, trained machine learning model(s) 790 can be configured to generate textual description 794 further based on semantic map 785.

Raw aerial image 783, composite aerial image 784, semantic map 785, and/or other aerial images may include and/or be associated with a representation of a location of the object within image space of the aerial image. The representation of the location of the object within the image space may include image space coordinates of the object as represented in the aerial image, thus providing an explicit representation of which pixel region in the aerial image represent the object.

In some examples, an estimated location of an object in the environment may be determined based on satellite-based navigation data associated with aerial image data 782. The estimated location of the object may be provided as input to trained machine learning model(s) 790 as part of aerial image data 782. The estimated location of the object could include, for instance, coordinates recorded by a UAV when the package is released by the UAV into the environment.

In further examples, error measurement 786 may be determined based on a comparison between the estimated location of the object in the environment and a predicted location of the object in the environment. For example, the estimated location may include coordinates to which a package has been delivered by the UAV, and the predicted location may include coordinates to which the UAV was instructed to deliver the package. Error measurement 786 between the estimated and predicted locations may be determined, for instance, if the package is delivered by the UAV to a location that differs from the predicted delivery location. Accordingly, trained machine learning model(s) 790 may be provided with error measurement 786 and configured to generate textual description 794 further based on the estimated location of the object and/or based on error measurement 786. As a result, textual description 794 may include, for instance, a statement that "the package was delivered 5 m away from the planned delivery location because a tree was detected at the planned delivery location," thus adding more detail and context to textual description 794.

In some examples, aerial image data 782 can include time data 787 representing a time at which aerial image data 782 was captured. Trained machine learning model(s) 790 can be configured to generate textual description 794 further based on time data 787. This could improve textual description 794 by providing more detail about package delivery to a recipient, e.g., the textual description 794 may state that "package was delivered at 4:02 pm near a red car."

In some examples, aerial image data 782 can include altitude data 788 representing an altitude at which aerial image data 782 was captured. Trained machine learning model(s) 790 can be configured to generate textual description 794 further based on altitude data 788. Altitude data 788 could be used by trained machine learning model(s) 790 to sort multiple aerial images provided as part of aerial image data 782 by the altitudes at which they were captured. Other types of input data are possible as well.

In some examples, textual description 794 can describe the location of an object in aerial image data 782 relative to another object in the environment. For example, if the object is a package, textual description 794 could state that "the package is near a red car parked on a driveway," where the "red car" is the other object in the environment. In some examples, textual description 794 can describe the location of an object in aerial image data 782 by including a cardinal direction, such as "the package is north of the house." The cardinal direction may be determined by trained machine learning model(s) 790 based on the estimated location of an object in the environment and/or error measurement 786.

In some examples, feedback 746 can include a textual response received from a client device, where the textual response may be provided in response to the client device receiving and/or displaying textual description 794. For instance, a recipient could be provided with textual description 794 of a package delivery location via text message, and prompted to send a response indicating whether textual description 794 and/or placement of the package was satisfactory. If the recipient's response indicates that textual description 794 was satisfactory, a new training sample may be generated. The new training sample may contain aerial image data 782 and corresponding textual description 794, and the new training sample could be used to further train machine learning model(s) 790. In some examples, aerial images and corresponding textual descriptions resulting from the inference phase 780 can be used as feedback 746.

IX. Example Image-Derived Text Delivery
Location Descriptions

Figure 8A:
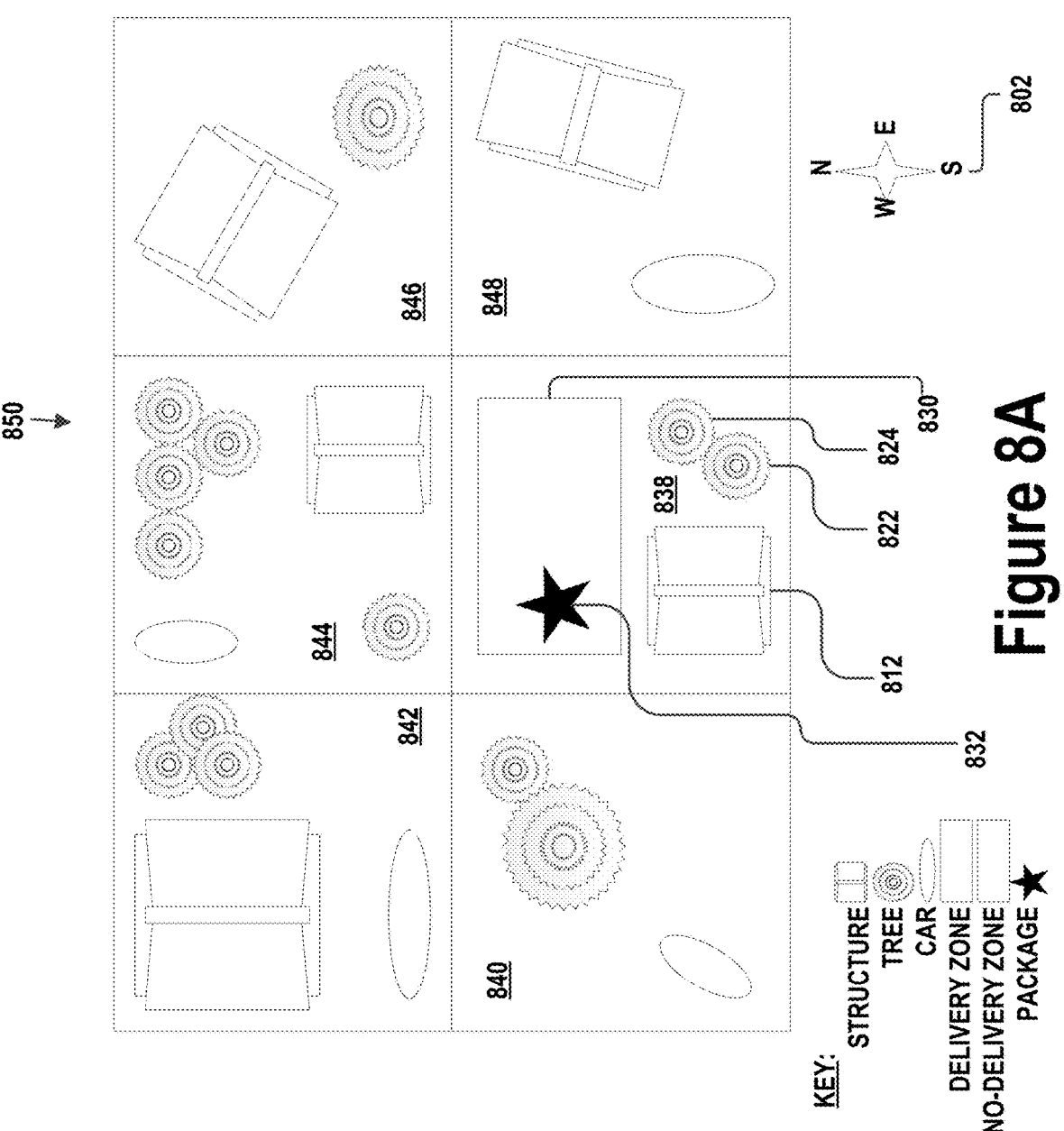
FIG. 8A illustrates an aerial image, in accordance with examples described herein.
Figure 8B:
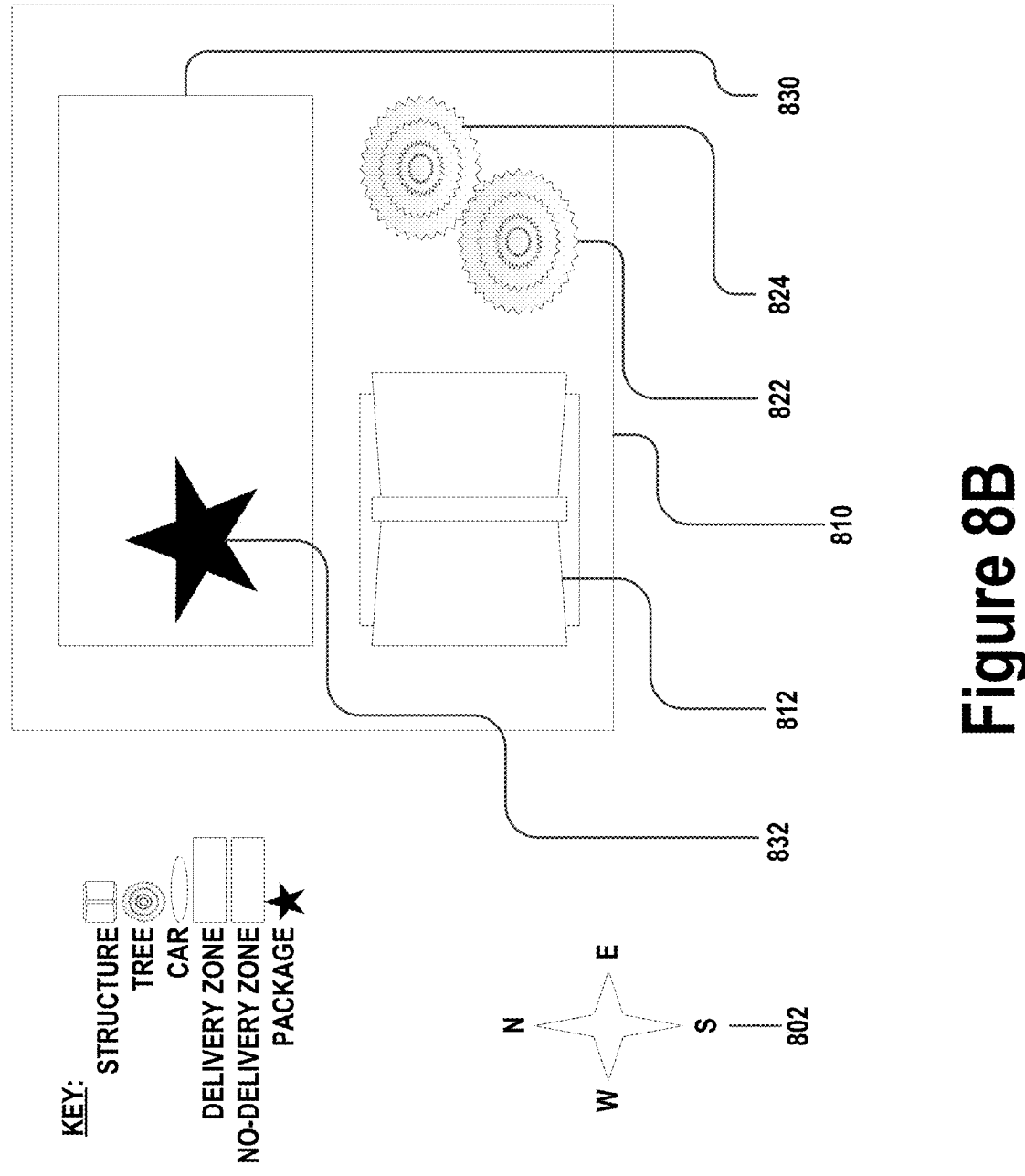
FIG. 8B illustrates an aerial image, in accordance with examples described herein.
Figure 8C:
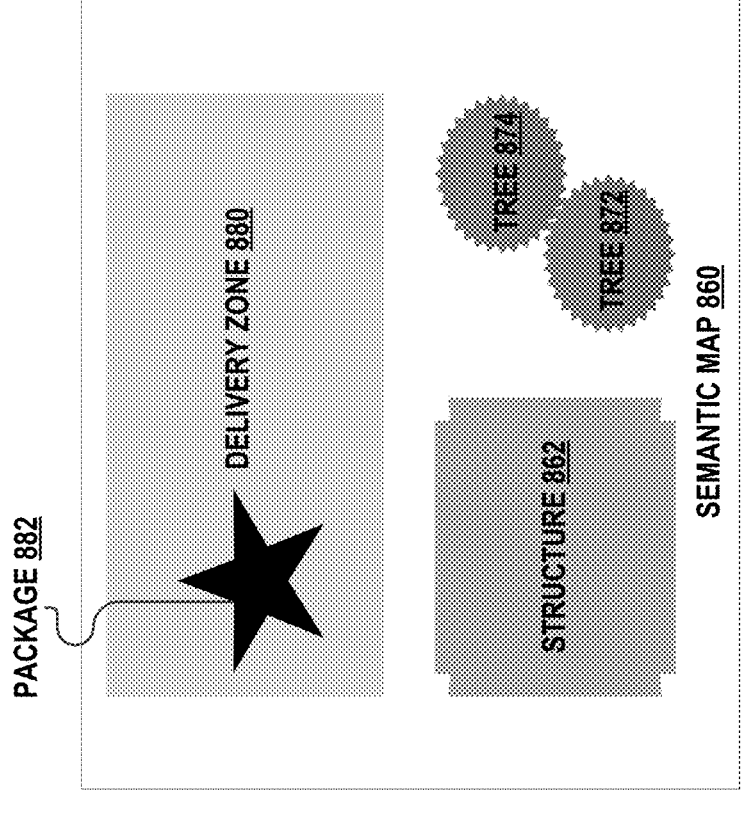
FIG. 8C illustrates a semantic map, in accordance with examples described herein.
Figure 8D:
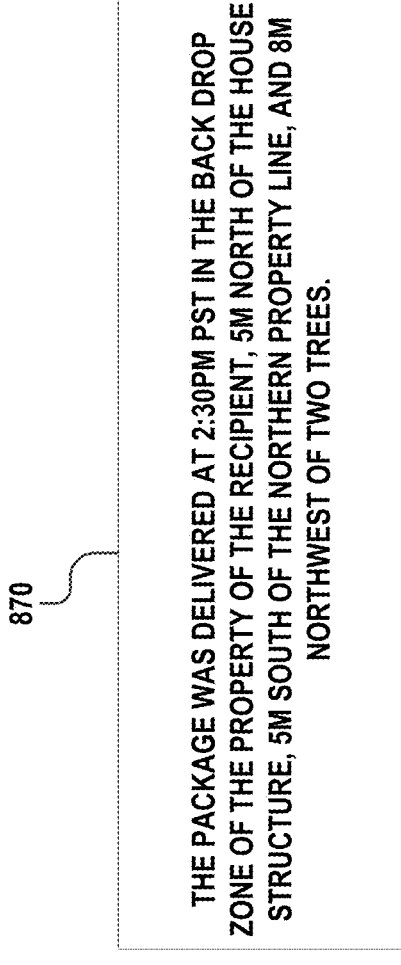
FIG. 8D illustrates a textual description, in accordance with examples described herein.

FIGS. 8A, 8B, and 8C illustrate examples of aerial image data, while FIG. 8D illustrates an example textual description corresponding to aspects of the visual content of FIGS. 8A, 8B, and 8C. Specifically, FIG. 8A illustrates an aerial image 850 of six adjoining regions of an environment: region 838, region 840, region 842, region 844, region 846, and region 848, each of which may represent a corresponding residential property. The cardinal directions are shown with compass 802. Region 838 includes a package 832, a building structure 812, a tree 822, a tree 824, and a delivery zone 830.

FIG. 8B illustrates another aerial image 810 of region 838, with the package 832, building structure 812, tree 822, tree 824, and delivery zone 830. Aerial image 810 represents a subset of aerial image 850.

FIG. 8C illustrates a semantic map 860 of region 838, based on aerial image 810 and/or aerial image 850. The semantic map 860 includes semantic region 882 representing package 832, semantic region 862 representing building structure 812, semantic region 872 representing tree 822, semantic region 874 representing tree 824, and semantic region 880 representing delivery zone 830.

FIG. 8D is a textual description 870 that could be generated using the process disclosed herein, and based on aerial image 810 and/or aerial image 850. Textual description 870 states that "The package was delivered at 2:30 PM PST in the back drop zone of the property of the recipient, 5 m north of the house structure, 5 m south of the northern property line, and 8 m northwest of two trees." Thus, textual description describes, using words, aspects of the visual content of aerial images 810 and/or 850.

Aerial image 810 provides one example of aerial image 402 of FIG. 4. Aerial image 810 and aerial image 850 could be processed by the image processor 500 to generate a composite aerial image. Aerial image 810 could be provided to the semantic engine 600, which may generate semantic map 860 based thereon. Text generation block 420 may process aerial image 810 and semantic map 860 using, for example, machine learning system 700 and/or 750. Additional inputs could be provided to machine learning system 700 and/or 750, such as a time at which aerial image 810 was captured. A textual description, such as textual description 870 could be generated based on aerial image 810, aerial image 850, and/or additional inputs.

Figure 9A:
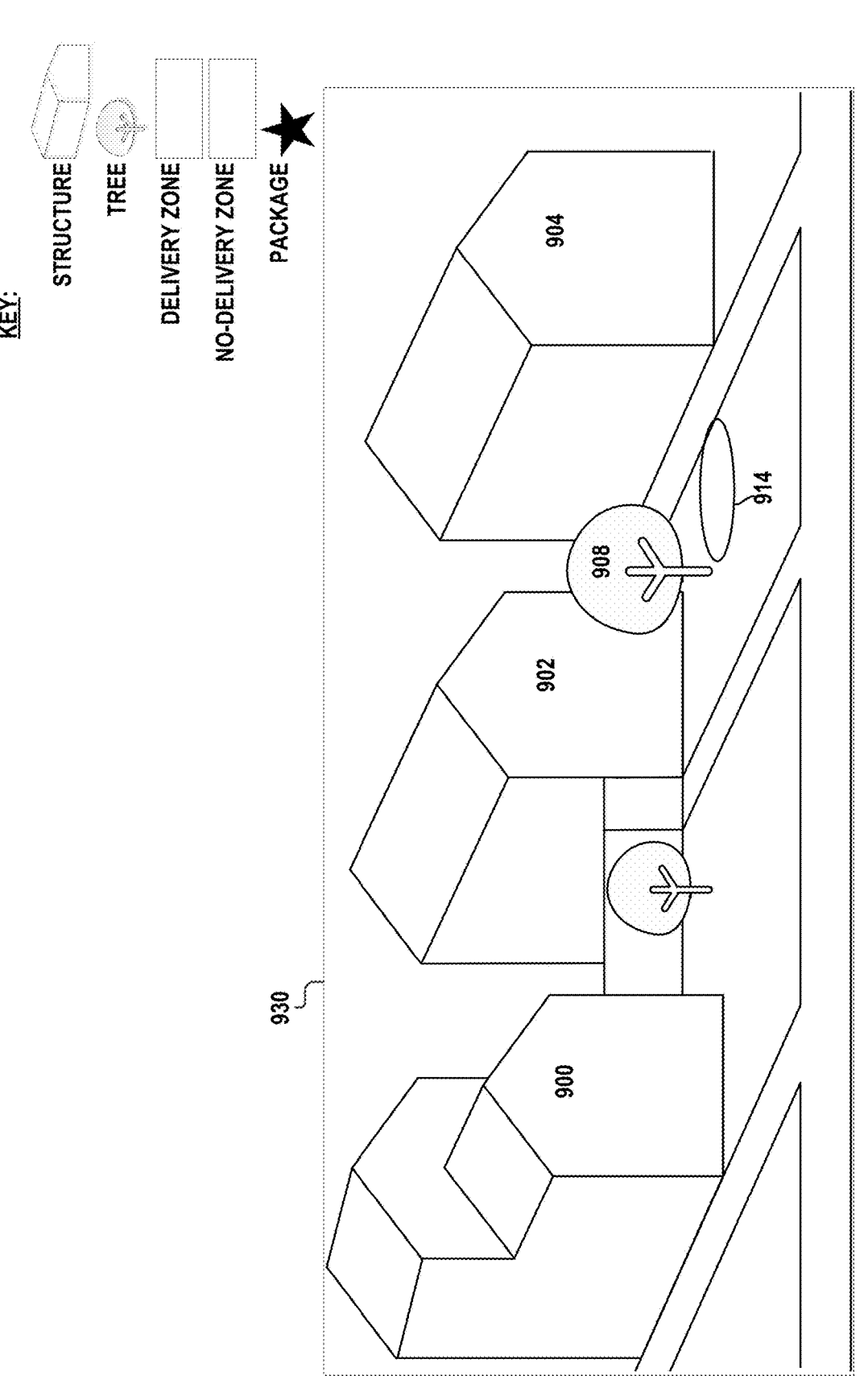
FIG. 9A illustrates an aerial image, in accordance with examples described herein.
Figure 9B:
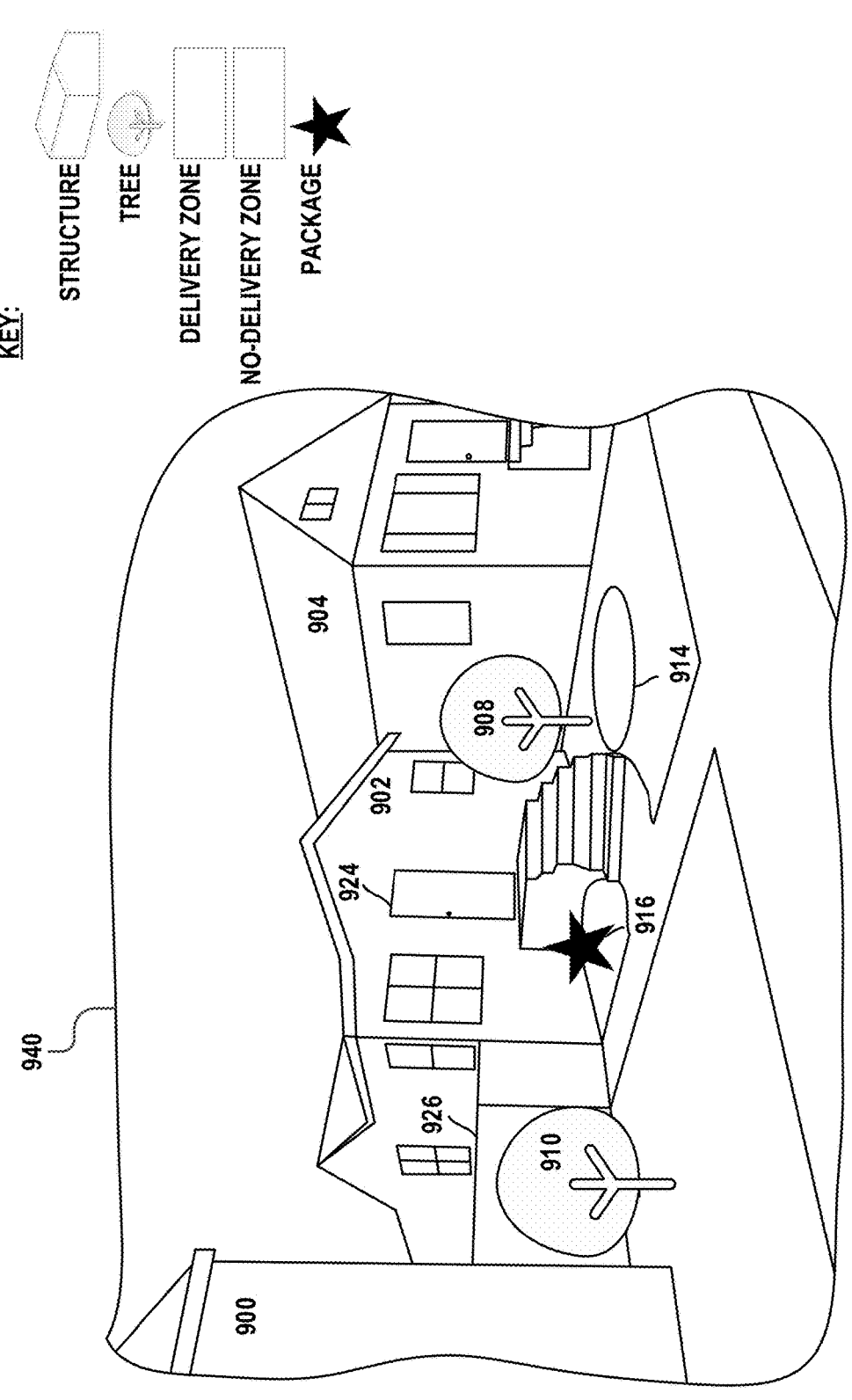
FIG. 9B illustrates an aerial image, in accordance with examples described herein.
Figure 9C:
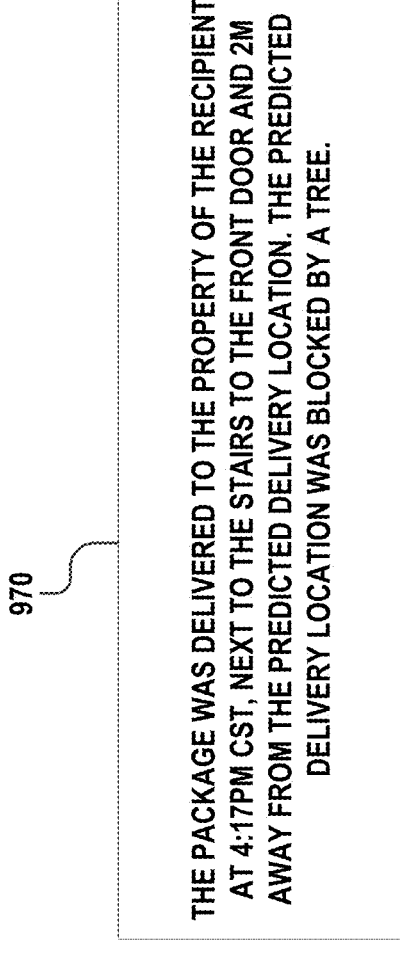
FIG. 9C illustrates a textual description, in accordance with examples described herein.

FIGS. 9A and 9B illustrate another example of aerial image data, while FIG. 9C illustrates an example textual description corresponding to aspects of the visual content of FIGS. 9A and 9B.

FIG. 9A illustrates aerial image 930 of three building structures: building structure 900, building structure 902, and building structure 904. Building structure 902 is adjacent to tree 908 and delivery zone 914.

FIG. 9B provides a close-up view of aspects of aerial image 930. Specifically, FIG. 9B illustrates another aerial image 940 of building structure 902, with tree 908 and delivery zone 914, as well as building structures 900 and 904, tree 910, door 924, fence 926, and package 916.

FIG. 9C is a textual description 970 that could be generated using the process disclosed herein, and based on aerial images 930 and/or 940. Textual description 970 states that "The package was delivered to the property of the recipient at 4:17 PM CST, next to the stairs to the front door and 2 m away from the predicted delivery location. The predicted delivery location was blocked by a tree." Thus, textual description describes, using words, aspects of the visual content of aerial images 930 and/or 940.

Aerial image 930 provides another example of aerial image 402 of FIG. 4. Aerial image 930 and aerial image 940 could be processed by the image processor 500 to generate a composite aerial image. An error measurement between the delivery zone 914 and the package 916 could be determined. Text generation block 420 may process aerial image 930 and the error measurement using, for example, machine learning system 700 and/or 750. Additional inputs could be provided to machine learning system 700 and/or 750, such as a time at which aerial image 930 was captured. A textual description, such as textual description 970 could be outputted based on the aerial image 930 and/or aerial image 940, and further generated based on additional inputs.

Textual descriptions 870 and/or 970 may be stored, transmitted to client device(s), and/or displayed using the client device(s). For example, textual descriptions 870 may be transmitted to and displayed using a client device associated with a recipient of package 832. Thus, textual description 870 may be used to inform the recipient of the location of package 832 without transmitting and/or displaying aerial images 810 and/or 850. In describing the location of package 832, textual description 870 references package 832, building structure 812, tree 822, tree 824, delivery zone 830, region 838, an estimated delivery time, and various cardinal directions, but does not reference region 840, region 842, region 844, region 846, region 848, nor any features contained within those region, thus maintaining the privacy of the visual features that are not referenced. Likewise, textual description 970 may be used to inform a recipient of the location of package 916 without transmitting and/or displaying aerial images 930 and/or 940. In describing the location of package 916, textual description 970 references building structure 902, tree 908, delivery zone 914, package 916, door 924, and an estimated delivery time, but does not reference building structure 900, building structure 904, nor tree 910, thus maintaining the privacy of the visual features that are not referenced.

X. Additional Example Operations

Figure 10:
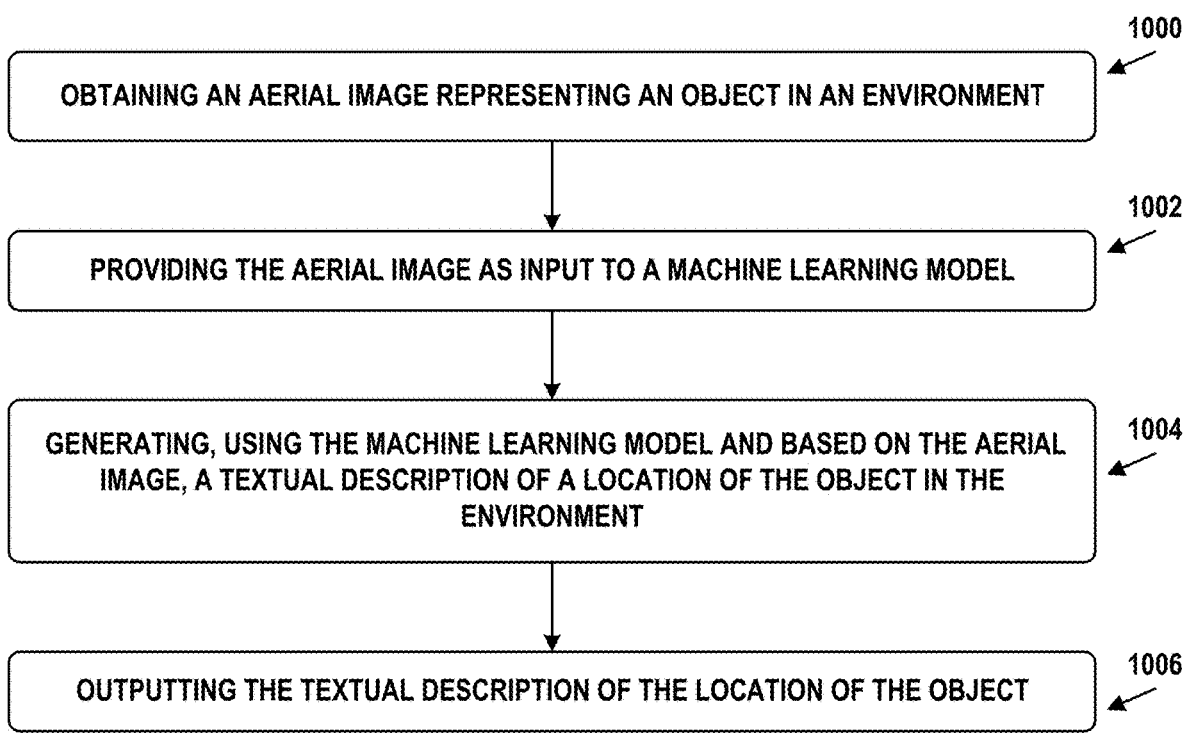
FIG. 10 is a flow chart, in accordance with examples described herein.

FIG. 10 illustrates a flow chart of operations related to generating image-derived text delivery location descriptions. The operations may be carried out by and/or using various computing devices, such as UAV 200, system 300, system 400, machine learning system 700, and/or machine learning system 750, among other possibilities. The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining an aerial image representing an object in an environment.

Block 1002 may involve providing the aerial image as input to a machine learning model.

Block 1004 may involve generating, using the machine learning model and based on the aerial image, a textual description of a location of the object in the environment.

Block 1006 may involve outputting the textual description of the location of the object.

In some examples, the object may include a package. In some examples, the package may have been delivered to the environment by an unmanned aerial vehicle. The aerial image may have been captured by the unmanned aerial vehicle.

In some examples, the machine learning model may have been trained using a plurality of training samples. Each respective training sample of the plurality of training samples may include (i) a corresponding aerial image of a corresponding training environment and (ii) a corresponding textual description of a location of a training object located in the corresponding training environment.

In some examples, the machine learning model may be configured to generate textual descriptions that anonymize visual information contained in the aerial images from the plurality of training samples.

In some examples, the corresponding textual description for each respective training sample might not make reference to objects outside of a designated boundary within the training environment.

In some examples, the aerial image may include a composite aerial image. Obtaining the aerial image may include obtaining a plurality of aerial images of the environment. At least some of the plurality of aerial images may represent the object, and the plurality of aerial images may represent the environment from different points of view. The composite aerial image may be determined by combining image data from the plurality of aerial images.

Some examples may include generating, using a semantic model and based on the aerial image, a semantic map that represents, for each respective visual feature of a plurality of visual features in the aerial image, a corresponding classification of the respective visual feature. The semantic map may be provided as input to the machine learning model. The machine learning model may be configured to generate the textual description further based on the semantic map.

In some examples, the aerial image may include a plurality of aerial images. The semantic model may be configured to generate the semantic map based on semantic information from the plurality of aerial images.

Some examples may include determining, based on satellite-based navigation data associated with the aerial image, an estimated location of the object in the environment. The estimated location of the object may be provided as input to the machine learning model. The machine learning model may be configured to generate the textual description further based on the estimated location of the object.

Some further examples may include determining, based on a comparison between the estimated location of the object in the environment and a predicted location of the object in the environment, an error measurement. The error measurement may be provided as input to the machine learning model. The machine learning model may be configured to generate the textual description further based on the error measurement.

Some examples may include providing, as input to the machine learning model, a time at which the aerial image was captured. The machine learning model may be configured to generate the textual description further based on the time at which the aerial image was captured.

Some examples may include providing, as input to the machine learning model, a representation of an altitude at which the aerial image was captured. The machine learning model may be configured to generate the textual description further based on the representation of the altitude at which the aerial image was captured.

Some examples may include transmitting, to a client device, the textual description, receiving, from the client device, a response to the transmitted textual description, and updating, based on the response, a status associated with the object.

Some examples may include modifying, based on the response, the textual description, and transmitting, to the client device, the modified textual description.

In some examples, the textual description of the location of the object may include the location of the object relative to another object in the environment.

In some examples, the textual description of the location of the object may include a cardinal direction.

Some examples may include a system or non-transitory computer readable medium including program instructions executable by one or more processors to perform some or all of the operations detailed above. Some further examples of systems include a UAV, where the aerial image may be captured by the UAV and the UAV may be configured to deliver the object to the environment.

XI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   obtaining an aerial image representing an object in an environment;
   generating, using a semantic model and based on the aerial image, a semantic map that represents, for each respective visual feature of a plurality of visual features in the aerial image, a corresponding classification of the respective visual feature;
   providing the aerial image and the semantic map as input to a machine learning model;
   generating, using the machine learning model and based on the aerial image and the semantic map, a textual description of a location of the object in the environment; and
   outputting the textual description of the location of the object.

2. The computer-implemented method of claim 1, wherein the object comprises a package.

3. The computer-implemented method of claim 2, wherein the package has been delivered to the environment by an unmanned aerial vehicle, and wherein the aerial image has been captured by the unmanned aerial vehicle.

4. The computer-implemented method of claim 1, wherein the machine learning model has been trained using a plurality of training samples, wherein each respective training sample of the plurality of training samples comprises (i) a corresponding aerial image of a corresponding training environment and (ii) a corresponding textual description of a location of a training object located in the corresponding training environment.

5. The computer-implemented method of claim 1, wherein the machine learning model is configured to generate textual descriptions that anonymize visual information contained in aerial images, and wherein the textual description anonymizes at least some visual information contained in the aerial image.

6. The computer-implemented method of claim 1, wherein the textual description does not refer to objects outside of a designated boundary within the training environment.

7. The computer-implemented method of claim 1, wherein the aerial image comprises a composite aerial image, and wherein obtaining the aerial image comprises:

obtaining a plurality of aerial images of the environment, wherein at least some aerial images of the plurality of aerial images represent the object, and wherein the plurality of aerial images represents the environment from different points of view; and determining the composite aerial image by combining image data from the plurality of aerial images.

8. The computer-implemented method of claim 1, wherein the aerial image comprises a plurality of aerial images, and wherein the semantic model is configured to generate the semantic map based on semantic information from the plurality of aerial images.

9. The computer-implemented method of claim 1, further comprising:

determining, based on satellite-based navigation data associated with the aerial image, an estimated location of the object in the environment; and providing the estimated location of the object as input to the machine learning model, wherein the machine learning model is configured to generate the textual description further based on the estimated location of the object.

10. The computer-implemented method of claim 9, further comprising:

determining, based on a comparison between the estimated location of the object in the environment and a predicted location of the object in the environment, an error measurement; and providing the error measurement as input to the machine learning model, wherein the machine learning model is configured to generate the textual description further based on the error measurement.

11. The computer-implemented method of claim 1, further comprising:

providing, as input to the machine learning model, a time at which the aerial image was captured, wherein the machine learning model is configured to generate the textual description further based on the time at which the aerial image was captured.

12. The computer-implemented method of claim 1, further comprising:

providing, as input to the machine learning model, a representation of an altitude at which the aerial image was captured, wherein the machine learning model is configured to generate the textual description further based on the representation of the altitude at which the aerial image was captured.

13. The computer-implement method of claim 1, further comprising:

transmitting, to a client device, the textual description;

receiving, from the client device, a response to the transmitted textual description; and updating, based on the response, a status associated with the object.

14. The computer-implement method of claim 13, further comprising:

modifying, based on the response, the textual description; and transmitting, to the client device, the modified textual description.

15. The computer-implemented method of claim 1, wherein the textual description of the location of the object describes the location of the object relative to another object in the environment.

16. The computer-implemented method of claim 1, wherein the textual description of the location of the object includes a cardinal direction.

17. The computer-implemented method of claim 1, wherein the semantic map facilitates anonymization of visual information in the aerial image by (i) including a classification of a first visual feature of the aerial image and (ii) masking a second visual feature of the aerial image.

18. A system comprising:

a processor; and a non-transitory computer-readable medium having stored thereon instructions that, when executed by the processor, cause the processor to perform operations comprising:

obtaining an aerial image representing an object in an environment;

generating, using a semantic model and based on the aerial image, a semantic map that represents, for each respective visual feature of a plurality of visual features in the aerial image, a corresponding classification of the respective visual feature;

providing the aerial image and the semantic map as input to a machine learning model;

generating, using the machine learning model and based on the aerial image and the semantic map, a textual description of a location of the object in the environment; and outputting the textual description of the location of the object.

19. The system of claim 18, further comprising:

an unmanned aerial vehicle, wherein the aerial image is captured by the unmanned aerial vehicle and wherein the operations further comprise:

delivering the object to the environment.

20. A non-transitory computer readable medium comprising program instructions executable by one or more processors to perform operations, the operations comprising:

obtaining an aerial image representing an object in an environment;

generating, using a semantic model and based on the aerial image, a semantic map that represents, for each respective visual feature of a plurality of visual features in the aerial image, a corresponding classification of the respective visual feature;

providing the aerial image and the semantic map as input to a machine learning model;

generating, using the machine learning model and based on the aerial image and the semantic map, a textual description of a location of the object in the environment; and outputting the textual description of the location of the object.

* * * * *